(12) United States Patent
Choi et al.

(10) Patent No.: US 12,118,274 B2
(45) Date of Patent: *Oct. 15, 2024

(54) ELECTRONIC DEVICE AND CONTROL METHOD THEREOF

(71) Applicant: Samsung Electronics Co., Ltd., Suwon-si (KR)

(72) Inventors: Hyungtak Choi, Suwon-si (KR); Hyeonmok Ko, Suwon-si (KR); Jihie Kim, Suwon-si (KR); Hongchul Kim, Suwon-si (KR); Inchul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,421

(22) Filed: Jun. 2, 2023

(65) Prior Publication Data

US 2023/0305801 A1 Sep. 28, 2023

Related U.S. Application Data

(63) Continuation of application No. 17/880,169, filed on Aug. 3, 2022, now Pat. No. 11,709,655, which is a
(Continued)

(30) Foreign Application Priority Data

Feb. 23, 2018 (KR) .................. 10-2018-0021876

(51) Int. Cl.
*G10L 17/22* (2013.01)
*G06F 3/00* (2006.01)
(Continued)

(52) U.S. Cl.
CPC ............... *G06F 3/167* (2013.01); *G06F 3/00* (2013.01); *G06F 3/005* (2013.01); *G06F 3/01* (2013.01);
(Continued)

(58) Field of Classification Search
CPC . G10L 17/22; G10L 17/18; G06F 3/16; G06F 3/011; G06F 3/005; G06F 3/167;
(Continued)

(56) References Cited

U.S. PATENT DOCUMENTS 6,882,859 B1 * 4/2005 Rao ...................... H04B 7/0413
345/173
7,761,591 B2 * 7/2010 Graham ................ G06Q 40/02
709/227
(Continued)

FOREIGN PATENT DOCUMENTS

CN  102693725 A  9/2012
CN  105070290 A  11/2015
(Continued)

OTHER PUBLICATIONS

Examination Report dated Apr. 4, 2022, issued in European Application No. 19757983.2.
(Continued)

*Primary Examiner* — Edwin S Leland, III
(74) *Attorney, Agent, or Firm* — Jefferson IP Law, LLP

(57) ABSTRACT

Disclosed is an electronic device. The electronic device comprises: a microphone comprising circuitry; a speaker comprising circuitry; and a processor electrically connected to the microphone and speaker, wherein the processor, when a first user's voice is input through the microphone, identifies a user who uttered the first user's voice and provides a first response sound, which is obtained by inputting the first user's voice to an artificial intelligence model learned
(Continued)

through an artificial intelligence algorithm, through the speaker, and when a second user's voice is input through the microphone, identifies a user who uttered the second user's voice, and if the user who uttered the first user's voice is the same as the user who uttered the second user's voice, provides a second response sound, which is obtained by inputting the second user's voice and utterance history information to the artificial intelligence model, through the speaker. In particular, at least some of the methods of providing a response sound to a user's voice may use an artificial intelligence model learned in accordance with at least one of a machine learning, neural network, or deep learning algorithm.

20 Claims, 23 Drawing Sheets

Related U.S. Application Data continuation of application No. 16/967,910, filed as application No. PCT/KR2019/000036 on Jan. 2, 2019, now Pat. No. 11,443,749.

(51) Int. Cl.
*G06F 3/01* (2006.01)
*G06F 3/16* (2006.01)
*G06F 18/20* (2023.01)
*G06K 9/00* (2022.01)
*G06V 40/16* (2022.01)
*G10L 17/18* (2013.01)

(52) U.S. Cl.
CPC ............... *G06F 3/011* (2013.01); *G06F 3/16* (2013.01); *G06F 18/20* (2023.01); *G06V 40/171* (2022.01); *G10L 17/18* (2013.01); *G10L 17/22* (2013.01)

(58) Field of Classification Search
CPC .... G06F 3/00; G06F 3/01; G06K 9/00; G06K 9/00281
USPC .......................................................... 704/232
See application file for complete search history.

(56) References Cited

U.S. PATENT DOCUMENTS

| | | | | |
|---|---|---|---|---|
| 8,095,400 B2* | 1/2012 | Herde | ................... | G06Q 10/02 705/5 |
| 8,514,195 B2* | 8/2013 | Arnold | ................... | G06F 3/041 345/173 |
| 8,525,796 B2* | 9/2013 | Arnold | ................... | G06F 3/041 178/18.05 |
| 8,831,677 B2* | 9/2014 | Villa-Real | ............... | H04M 1/66 455/552.1 |
| 8,860,681 B2* | 10/2014 | Arnold | ................... | G06F 3/041 345/173 |
| 9,092,129 B2* | 7/2015 | Abdo | .................. | G06F 3/04883 |
| 9,098,467 B1* | 8/2015 | Blanksteen | ............. | G10L 15/22 |
| 9,202,465 B2 | 12/2015 | Talwar et al. | | |
| 9,230,559 B2 | 1/2016 | Yoon et al. | | |
| 9,424,840 B1* | 8/2016 | Hart | ......................... | G10L 15/22 |
| 9,679,300 B2* | 6/2017 | Lynch | ................. | G06Q 30/0201 |
| 9,837,102 B2 | 12/2017 | Zad Issa et al. | | |
| 10,057,227 B1* | 8/2018 | Hess | ....................... | G06F 21/31 |
| 10,475,451 B1* | 11/2019 | Lynch | ..................... | G10L 15/22 |
| 11,443,749 B2* | 9/2022 | Choi | ......................... | G06F 3/00 |
| 11,709,655 B2* | 7/2023 | Choi | .................... | G06V 40/171 704/232 |
| 2010/0082341 A1* | 4/2010 | Kim | ......................... | G10L 17/02 704/E17.001 |
| 2010/0185448 A1* | 7/2010 | Meisel | ..................... | G06F 3/167 704/E15.005 |
| 2011/0035671 A1* | 2/2011 | Iwai | ...................... | H04N 1/0035 715/728 |
| 2012/0245934 A1 | 9/2012 | Talwar et al. | | |
| 2013/0080167 A1* | 3/2013 | Mozer | .................... | G10L 15/22 704/E17.001 |
| 2013/0339032 A1 | 12/2013 | Yoon et al. | | |
| 2014/0074483 A1* | 3/2014 | van Os | ................... | G10L 15/22 704/275 |
| 2014/0149118 A1* | 5/2014 | Lee | .......................... | G10L 15/22 704/251 |
| 2014/0195249 A1 | 7/2014 | Chung et al. | | |
| 2016/0005422 A1 | 1/2016 | Zad Issa et al. | | |
| 2016/0034166 A1* | 2/2016 | Wilson | .................. | G06F 3/0482 715/771 |
| 2016/0154777 A1* | 6/2016 | Shin | ..................... | G06F 16/9535 715/271 |
| 2016/0336024 A1 | 11/2016 | Choi et al. | | |
| 2017/0084274 A1* | 3/2017 | Kim | ......................... | G10L 15/183 |
| 2017/0103755 A1* | 4/2017 | Jeon | ........................ | G06F 3/167 |
| 2018/0060029 A1* | 3/2018 | Kogan | .................. | G06F 16/285 |
| 2018/0189352 A1* | 7/2018 | Ghafourifar | ............ | G06F 9/451 |
| 2019/0138267 A1* | 5/2019 | Mailey | ................ | G06F 3/04817 |
| 2019/0197748 A1* | 6/2019 | Vandewall | .............. | G06T 11/60 |
| 2019/0222540 A1* | 7/2019 | Relangi | ............. | H04M 3/42042 |
| 2020/0320989 A1* | 10/2020 | Watanabe | ............... | G06F 9/453 |
| 2021/0027790 A1* | 1/2021 | Choi | ....................... | G06F 18/00 |

FOREIGN PATENT DOCUMENTS

| | | | | |
|---|---|---|---|---|
| CN | 106558307 A | | 4/2017 | |
| CN | 106663446 A | | 5/2017 | |
| CN | 106776578 A | | 5/2017 | |
| JP | 2012-211954 A | | 11/2012 | |
| JP | 6505117 B2 * | | 4/2019 | ............ G10L 15/00 |
| KR | 10-2006-0070605 A | | 6/2006 | |
| KR | 10-2013-0141241 A | | 12/2013 | |
| KR | 10-2014-0039868 A | | 4/2014 | |
| KR | 10-2014-0051651 A | | 5/2014 | |
| KR | 10-2014-0068752 A | | 6/2014 | |
| KR | 10-2016-0060335 A | | 5/2016 | |
| KR | 10-2016-0065671 A | | 6/2016 | |
| KR | 10-2016-0122564 A | | 10/2016 | |
| KR | 10-2016-0132748 A | | 11/2016 | |
| KR | 102429582 B1 * | | 8/2022 | |

OTHER PUBLICATIONS

Extended European Search Report dated Dec. 7, 2020; issued in European Application No. 19757983.2.
Korean Office Action dated Jul. 12, 2022, issued in Korean Application No. 10-2018-0021876.
Chinese Office Action dated Mar. 24, 2023, issued in Chinese Application No. 201980007993.6.
Korean Office Action with English translation dated Sep. 21, 2023; Korean Appln. No. 10-2023-0037918.
Chinese Office Action with English translation dated Nov. 1, 2023; Chinese Appln. No. 201980007993.6.
Notice of Allowance dated Jan. 25, 2023, issued by the Korean Patent Office in Korean Application No. 10-2018-0021876.
Chinese Notice to Grant with English translation dated Apr. 1, 2024; Chinese Appln. No. 201980007993.6.
European Search Report dated Jan. 24, 2024; European Appln. No. 19 757 983.2-1224.
Korean Office Action with English translation dated May 27, 2024; Korean Appln. No. 10-2023-0037918.

* cited by examiner

ELECTRONIC DEVICE AND CONTROL METHOD THEREOF

CROSS-REFERENCE TO RELATED APPLICATION(S)

This application is a continuation application of prior application Ser. No. 17/880,169 filed on Aug. 3, 2022, which is a continuation of application of prior application Ser. No. 16/967,910 filed on Aug. 6, 2020; which has issued as U.S. Pat. No. 11,443,749, which is a U.S. National Stage application under 35 U.S.C. § 371 of an International Application No. PCT/KR2019/000036 filed on Jan. 2, 2019; which is based on and claims priority of a Korean patent application number 10-2018-0021876 filed on Feb. 23, 2018, in the Korean Intellectual Property Office, the entire disclosure of each of which is incorporated by reference herein in its entirety.

TECHNICAL FIELD

The disclosure relates to an electronic device and a control method therefor, and more particularly to an electronic device which identifies a user's voice and provides various interactions according to the identified user's voice and a control method therefor.

The disclosure further relates to an artificial intelligence (AI) system simulating functions of the human brain such as recognition or determination using a machine learning algorithm, and an application thereof.

BACKGROUND ART

Recently, artificial intelligence systems realizing intelligence of a human level have been used in various fields. The artificial intelligence system is a system in which a machine trains, determines, and becomes smart, itself, unlike the conventional rule-based smart system. As the artificial intelligence system is used, a recognition rate is improved and preferences of a user can be more accurately understood, and thus, the conventional rule-based system is gradually being replaced with deep learning-based artificial intelligence system.

The artificial intelligence technologies are composed of machine learning (e.g., deep learning) and elementary technologies using the machine learning. The machine learning is an algorithm technology of self-classifying/self-training features of input data, and the elementary technology is a technology of simulating functions of the human brain such as recognition or determination using the machine learning algorithm such as the deep learning and is composed of technical fields of language understanding, visual understanding, inference/prediction, knowledge representation, operation control, and the like.

Various fields, to which the artificial intelligence technologies are applied, are as follows. The language understanding is a technology of recognizing languages/alphabets of human and applying/processing it and includes natural language processing, machine translation, a conversion system, question and answer, voice recognition/synthesis, and the like. The visual understanding is a technology of recognizing an object in a view of human and processing it and includes object recognition, object tracking, image searching, human recognition, scene understanding, space understanding, image improvement, and the like. The inference/prediction is a technology of identifying the information and logically inferring and predicting it and includes knowledge/possibility-based inference, optimization prediction, preference-based planning, recommendation, and the like. The knowledge representation is a technology of performing automating processing of experiment information of human into knowledge data and includes knowledge construction (data generation/classification), knowledge management (data application), and the like. The operation control is a technology of controlling automatic driving of a vehicle or movement of a robot and includes movement control (navigation, collision, or travelling), manipulation control (behavior control), and the like.

Meanwhile, conventionally, electronic devices which identify a user's voice and provide various interactions according to the identified user's voice have been developed. In addition, the electronic devices may not only provide a response to the one-time user's voice, but also receive continuous user's voices and provide responses by reflecting utterance history. However, when a user's voice of another user was received between the continuous user's voices, the electronic devices were not able to distinguish these and provided completely wrong responses.

DISCLOSURE

Technical Problem

The disclosure is made in view of the above-mentioned needs and an object of the disclosure is to provide an electronic device which provides a response with a maintained context, although user's voices are input from a plurality of users, respectively, and a control method therefor.

Technical Solution

According to an embodiment of the disclosure for achieving the above-mentioned object, there is provided an electronic device including a microphone, a speaker, and a processor configured to be electrically connected to the microphone and the speaker, in which the processor is configured to, based on a first user's voice being input via the microphone, identify a user who uttered the first user's voice and provide a first response sound obtained by inputting the first user's voice to an artificial intelligence model trained through an artificial intelligence algorithm via the speaker, based on a second user's voice being input via the microphone, identify a user who uttered the second user's voice, and based on the user who uttered the first user's voice being the same as the user who uttered the second user's voice, provide a second response sound obtained by inputting the second user's voice and utterance history information to the artificial intelligence model via the speaker.

The device may further include a storage, and the processor may be configured to, based on the user who uttered the second user's voice being different from the user who uttered the first user's voice, store the second user's voice in the storage, and based on a user's voice not being input from the user who uttered the first user's voice for a predetermined period of time or longer, provide a third response sound obtained by inputting the second user's voice to the artificial intelligence model via the speaker.

The processor may be configured to, based on the first user's voice being input, identify a first user who uttered the first user's voice and provide the first response sound obtained by inputting the first user's voice to the artificial intelligence model via the speaker, and based on the second user's voice being input, identify a second user who uttered the second user's voice and provide a third response sound obtained by inputting the second user's voice to the artificial intelligence model via the speaker to be distinct from the first response sound.

The processor may be configured to, based on a first additional user's voice being input by the first user, provide a first additional response sound obtained by inputting the first additional user's voice and first utterance history information corresponding to the first user's voice to the artificial intelligence model via the speaker, and based on a second additional user's voice being input by the second user, provide a second additional response sound obtained by inputting the second additional user's voice and second utterance history information corresponding to the second user's voice to the artificial intelligence model via the speaker to be distinct from the first additional response sound.

The device may further include a display electrically connected to the processor, and the processor may be configured to display a first UI corresponding to the first user via the display while providing the first additional response sound, and display a second UI corresponding to the second user via the display while providing the second additional response sound.

The processor may be configured to, based on the user who uttered the first user's voice being different from the user who uttered the second user's voice, obtain a first domain corresponding to the first user's voice and a second domain corresponding to the second user's voice, and based on the first domain being the same as the second domain, provide the second response sound obtained by inputting the second user's voice and the utterance history information to the artificial intelligence model via the speaker.

The device may further include a storage electrically connected to the processor, and the processor may be configured to, based on the second user's voice being input within a first predetermined period of time from a point when the first user's voice is input, the user who uttered the first user's voice being the same as the user who uttered the second user's voice, and a first domain corresponding to the first user's voice being different from a second domain corresponding to the second user's voice, store the first user's voice in the storage without providing the first response sound, and provide a third response sound obtained by inputting the second user's voice to the artificial intelligence model via the speaker.

The processor may be configured to, based on a user's voice corresponding to the second domain not being input from the user for a second predetermined period of time or longer, provide the first response sound obtained by inputting the first user's voice stored in the storage to the artificial intelligence model via the speaker.

The device may further include a camera, and the processor may be configured to identify the user based on at least one of an image captured by the camera or a user's voice input via the microphone.

The processor may be configured to identify the user who uttered the first user's voice based on a shape of mouth of a user included in the image for a period of time during which the first user's voice is input, and based on the shape of mouth of the identified user included in the image being changed for a period of time during which the second user's voice is input, identify the user who uttered the second user's voice to be the same as the user who uttered the first user's voice.

According to an embodiment of the disclosure, there is provided a method for controlling an electronic device, the method including based on a first user's voice being input, identifying a user who uttered the first user's voice, providing a first response sound obtained by inputting the first user's voice to an artificial intelligence model trained through an artificial intelligence algorithm, based on a second user's voice being input, identifying a user who uttered the second user's voice, and based on the user who uttered the first user's voice being the same as the user who uttered the second user's voice, providing a second response sound obtained by inputting the second user's voice and utterance history information to the artificial intelligence model.

The method may further include based on the user who uttered the second user's voice being different from the user who uttered the first user's voice, storing the second user's voice, and based on a user's voice not being input from the user who uttered the first user's voice for a predetermined period of time or longer, providing a third response sound obtained by inputting the second user's voice to the artificial intelligence model.

The identifying a user who uttered the first user's voice may include based on the first user's voice being input, identifying a first user who uttered the first user's voice, the providing a first response sound may include providing the first response sound obtained by inputting the first user's voice to the artificial intelligence model, the identifying a user who uttered the second user's voice may include identifying a second user who uttered the second user's voice, and the method may further include providing a third response sound obtained by inputting the second user's voice to the artificial intelligence model to be distinct from the first response sound.

The method may further include based on a first additional user's voice being input by the first user, providing a first additional response sound obtained by inputting the first additional user's voice and first utterance history information corresponding to the first user's voice to the artificial intelligence model, and based on a second additional user's voice being input by the second user, providing a second additional response sound obtained by inputting the second additional user's voice and second utterance history information corresponding to the second user's voice to the artificial intelligence model to be distinct from the first additional response sound.

The providing a first additional response sound may include a first UI corresponding to the first user while providing the first additional response sound, and the providing a second additional response sound to be distinct from the first additional response sound may include displaying a second UI corresponding to the second user while providing the second additional response sound.

The method may further include based on the user who uttered the first user's voice being different from the user who uttered the second user's voice, obtaining a first domain corresponding to the first user's voice and a second domain corresponding to the second user's voice, and based on the first domain being the same as the second domain, providing the second response sound obtained by inputting the second user's voice and the utterance history information to the artificial intelligence model.

In the method, based on the second user's voice being input within a first predetermined period of time from a point when the first user's voice is input, the user who uttered the first user's voice being the same as the user who uttered the second user's voice, and a first domain corresponding to the first user's voice being different from a second domain corresponding to the second user's voice, the first user's voice may be stored in the storage without providing the first response sound, and a third response sound obtained by inputting the second user's voice to the artificial intelligence model may be provided.

The method may further include based on a user's voice corresponding to the second domain not being input from the user for a second predetermined period of time or longer, providing the first response sound obtained by inputting the first user's voice to the artificial intelligence model.

The identifying a user may include identifying the user based on at least one of a captured image or an input user's voice.

The identifying a user who uttered the first user's voice may include identifying the user who uttered the first user's voice based on a shape of mouth of a user included in the image for a period of time during which the first user's voice is input, and the providing a second response sound may include, based on the shape of mouth of the identified user included in the image being changed for a period of time during which the second user's voice is input, identifying the user who uttered the second user's voice to be the same as the user who uttered the first user's voice.

Effect of Invention

According to the embodiments of the disclosure described above, when user's voices are input from a plurality of users, respectively, the electronic device is able to provide a response while maintaining a context by processing, postponing, or separately processing a plurality of user's voices based on the existing user's voices.

DETAILED DESCRIPTION OF EXEMPLARY EMBODIMENTS

Figure 1A:
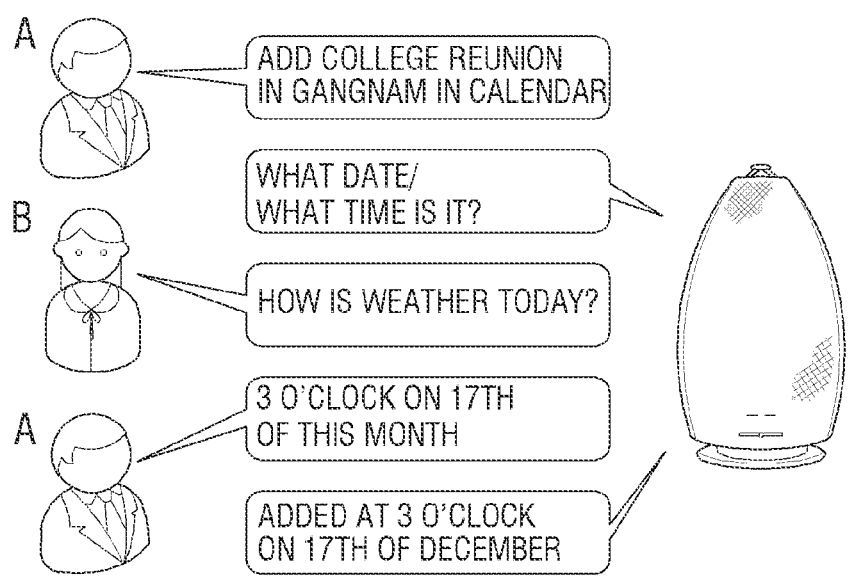
FIGS. 1A and 1B are views for explaining a method for processing a plurality of user's voices according to an embodiment.

Hereinafter, various embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily mean that a device is "specifically designed to" in terms of hardware. Instead, under some circumstances, the expression "a device configured to" may mean that the device "is capable of" performing an operation together with another device or component. For example, the phrase "a unit or a processor configured (or set) to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

An electronic device according to various embodiments of the disclosure may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a mobile medical device, a camera, or a wearable device. A wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implant type (implantable circuit). In addition, in some embodiments, the electronic device may include at least one of, for example, a television, a digital video disk (DVD) player, an audio system, a refrigerator, air-conditioner, a vacuum cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the electronic device may include at least one of a variety of medical devices (e.g., various portable medical measurement devices such as a blood glucose meter, a heart rate meter, a blood pressure meter, or a temperature measuring device, magnetic resonance angiography (MRA), magnetic resonance imaging (MRI), or computed tomography (CT) scanner, or ultrasonic wave device, etc.), a navigation system, a global navigation satellite system (GNSS), an event data recorder (EDR), a flight data recorder (FDR), an automotive infotainment device, a marine electronic equipment (e.g., marine navigation devices, gyro compasses, etc.), avionics, a security device, a car head unit, industrial or domestic robots, a drone, an ATM of financial institution, a point of sale of (POS) a store, or an Internet of Things (IoT) device (e.g., light bulbs, sensors, sprinkler devices, fire alarms, thermostats, street lights, toasters, exercise equipment, hot water tanks, heater, boiler, etc.).

In this disclosure, a term "user" may refer to a person using an electronic device or a device (e.g., an artificial intelligence electronic device) using an electronic device.

Figure 1B:

FIGS. 1A and 1B are views for explaining a method for processing a plurality of user's voices according to an embodiment of the disclosure.

As illustrated in FIG. 1A, an electronic device may receive a user's voice uttered by a user A. For example, the electronic device may receive a user's voice of "Add college reunion in Gangnam in calendar" uttered by the user A.

The electronic device may transmit the user's voice of the user A to an external server. The external server may include a first server for converting the user's voice into a text and a second server for providing response information to the user's voice based on the converted text, but this is merely an embodiment, and the external server may be implemented as a single server.

The external server may convert the user's voice received from the electronic device into a text through the Speech-to-Text (STT) technology. The external server may obtain response information to the user's voice by inputting the converted text to an artificial intelligence model trained through an artificial intelligence algorithm. The response information may be a response sound including a response to the user's voice and may be transmitted to the electronic device as audio data. Alternatively, the response information may be text information obtained by the second server and may be converted into a response sound by the first server by using the Text-to-Speech (TTS) technology and transmitted to the electronic device. However, there is no limitation thereto, and the response information may further include information regarding an image, in addition to the information regarding the voice. In such a case, the information regarding the image may be information such as a text, an image, an URL, or the like including a response to the user's voice. In addition, the information regarding the voice may be the same as the information regarding the image, but this is merely an embodiment, and the information regarding the voice may include only a part of the information regarding the image or may be summarized information of the information regarding the image.

The external server may transmit the response sound to the user's voice to the electronic device. For example, the external server may transmit a response sound of "What date and what time is it?" as a response to the user's voice of the user A to the electronic device. The electronic device may provide the received response sound.

However, the function of providing the response sound by the external server may be executed by the electronic device. For example, the electronic device may convert a user's voice uttered by the user A into a text, obtain response information to the user's voice by inputting the converted text to an artificial intelligence model, change the response information to a response sound, and provide the response sound to the user A.

Hereinafter, the electronic device may receive a user's voice uttered by a user B. For example, the electronic device may receive a user's voice of "How is the weather today?" uttered by a user B.

The electronic device may determine whether or not the users are the same by comparing the user's voice of the user A and the user's voice of the user B. For example, the electronic device may determine whether or not the users are the same based on a voiceprint of each of the user's voice of the user A and the user's voice of the user B. If the users are different from each other, the electronic device may store the user's voice of the user B in a storage and may not transmit the user's voice to the external server.

Alternatively, the external server may determine whether or not the users are the same. For example, the electronic device may transmit the user's voice of the user B to the external server, without determining whether or not the users are the same. The external server may determine whether or not the users are the same by comparing the received user's voice of the user B and the previous user's voice of the user A. If the users are different from each other, the external server may store the user's voice of the user B in a storage. In such a case, the external server may not generate a response sound to the user's voice of the user B. The electronic device may not receive any information from the external server and may not provide a response sound to the user's voice of the user B. In addition, the external server may be in a situation of providing the response to the user A and may transmit a response sound guiding the user B to wait to the electronic device. The electronic device may provide the received response sound to the user B.

Then, the electronic device may receive a user's voice uttered by the user A. For example, the electronic device may receive a user's voice of "3 o'clock on 17th of this month" uttered by the user A.

The electronic device may provide a response sound to the user's voice of the user A by the same method as described above. For example, the electronic device may provide a response sound of "Added at 3 o'clock on 17th of December" to the user's voice of the user A.

Then, as illustrated in FIG. 1B, if a user's voice is not input from the user A for a predetermined period of time, the electronic device may transmit the user's voice of "How is the weather today?" uttered by the user B to the external server. The external server may transmit a response sound of "Today's weather you asked a while ago is fine" to the user's voice of the user B to the electronic device by the same method as described above. The electronic device may provide the received response sound to the user B. The electronic device may identify the presence of the user B and provide the response sound. If the presence of the user B is not identified, the electronic device may store the response sound in the storage and may provide the response sound, if the presence of the user B is identified later.

In addition, when the external server stores the user's voice of the user B and the external server provides the response sound of "Added at 3 o'clock on 17th of December" to the electronic device, the external server may determine that the interaction with the user A has ended. When it is determined that the interaction with the user A has ended, the external server may transmit the response sound of "Today's weather you asked a while ago is fine" to the user's voice of the user B stored in the storage to the electronic device.

The trained model provided by the external server as described above may be, for example, a model based on a neural network as a determination model trained based on an artificial intelligence algorithm. The trained determination model may be designed to simulate a brain structure of human on the computer and may include a plurality of network nodes including weights and simulating neurons of the neural network of human. The plurality of network nodes may form connections to each other to simulate a synaptic activity in that the neurons transmit and receive signals through synapse. In addition, the trained determination model may include, for example, a neural network model or a deep learning model developed from the neural network model. In a deep learning model, a plurality of network nodes may be positioned at depths (or on layers) different from each other and may transmit and receive data according to the convolution connection. Examples of the trained determination model may include a deep neural network (DNN), a recurrent neural network (RNN), and a bidirectional recurrent deep neural network (BRDNN), but there is no limitation thereto.

In addition, the electronic device may use a personal assistant program which is an artificial intelligence dedicated program (or artificial intelligence agent) in order to receive the responses to the user's voices as sounds and images as described above. The personal assistant program may be executed by the existing generic-purpose processor (e.g., CPU) or a separate AI dedicated processor (e.g., GPU) as a dedicated processor for providing artificial intelligence (AI)-based service.

Specifically, the artificial intelligence agent may be operated (or executed) when a predetermined user input (e.g., user utterance corresponding to a text indicating an electronic device or the like) is input or a button (e.g., button for executing the artificial intelligence agent) provided on the electronic device is pressed. The artificial intelligence agent may transmit an input user's voice to an external server, provide a response sound to the user's voice via a speaker based on information regarding a voice received from the external server, and provide a guide screen including the response to the user's voice based on the information regarding an image received from the external server.

When a predetermined user input is detected on a screen or a button (e.g., button for executing the artificial intelligence agent) provided on the electronic device is pressed, the artificial intelligence agent may be operated. In addition, the artificial intelligence agent may be in a state of being already executed before the predetermined user input is detected or the button provided on the electronic device is pressed. In this case, the artificial intelligence agent of the electronic device may provide a voice and an image including the response to the user's voice after the predetermined user input is detected or the button provided on the electronic device is pressed. In addition, the artificial intelligence agent may be in a standby state before the predetermined user input is detected or the button provided on the electronic device is pressed. The standby state is a state of detecting reception of a predefined user input in order to control the start of the operation of the artificial intelligence agent. When the predetermined user input is detected or the button provided on the electronic device is pressed while the artificial intelligence agent is in the standby state, the electronic device may operate the artificial intelligence agent and provide a voice and an image including the response to the user's voice.

According to another embodiment of the disclosure, when the electronic device directly obtains information regarding a voice and an image including a response to a user's voice by using an artificial intelligence model, the artificial intelligence agent may obtain information regarding a voice and an image by controlling an artificial intelligence model. The artificial intelligence agent may execute the operation of the external server described above.

Figure 2:
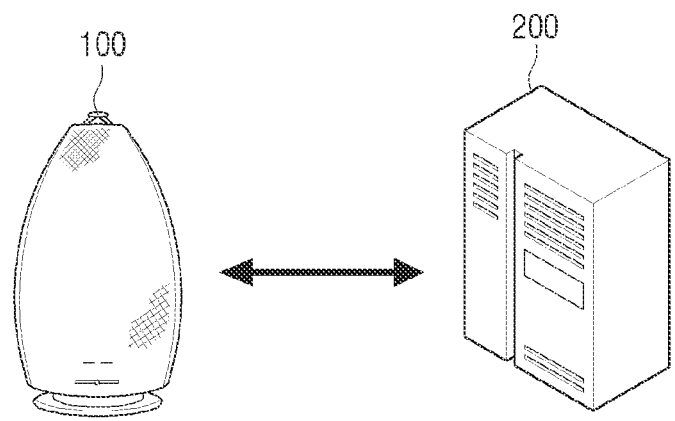
FIG. 2 is a view illustrating an electronic system which provides a response sound to a user's voice according to an embodiment.

FIG. 2 is a view illustrating an electronic system which provides a response sound to a user's voice according to an embodiment of the disclosure. As illustrated in FIG. 2, the electronic system may include an electronic device 100 and an external server 200.

The electronic device 100 may store an artificial intelligence dedicated program. The artificial intelligence dedicated program may be implemented in various aspects.

First, regarding an artificial intelligence dedicated program according to a first aspect, the electronic device 100 may be used in order to receive a user's voice and provide a response sound to the user's voice. In such a case, the electronic device 100 may transmit an input user's voice to the external server 200, receive a response sound to the user's voice from the external server 200, and provide the received response sound to the user.

The external server 200 may identify a user from the user's voice received from the electronic device 100. For example, the external server 200 may identify a user from a voiceprint of the user's voice. However, there is no limitation thereto, and any method for identifying a user from the user's voice may be used.

The external server 200 may determine a domain of the user's voice. For example, when a user's voice of "How is the weather today?" is received, the external server 200 may identify that a domain of the received user's voice is an information request domain. In addition, when a user's voice of "Turn the latest music on" is received, the external 200 may identify that a domain of the received user's voice is a device control domain.

Further, the external server 200 may determine whether or not a context of the received user's voice coincides with a context of utterance history information. For example, if a user's voice of "How is the weather today?" is received and then a user's voice of "What about tomorrow?" is received, the external server 200 may determine that the contexts coincide with each other. In addition, if a user's voice of "How is the weather today?" is received and then a user's voice of "What's on TV now?" is received, the external server 200 may determine that the contexts does not coincide with each other.

The external server 200 may generate response information based on the identified user, the domain of the received voice, and whether or not the contexts thereof coincide with each other. That is, the information indicating the identified user, the domain of the received voice, and whether or not the contexts thereof coincide with each other may be input to an artificial intelligence model stored in the external server 200 together with the user's voice.

However, this is merely an embodiment and only the user's voice may be input to the artificial intelligence model. For example, the artificial intelligence model may include a first artificial intelligence sub-model which identifies a user from an input user's voice and a second artificial intelligence sub-model which generates response information from the user's voice.

In such a case, the second artificial intelligence sub-model may not determine the domain of the user's voice and whether or not the contexts coincide with each other. However, a sample dialogue pattern or the like used in a training process of the second artificial intelligence sub-model may be generally a dialogue pattern with the coinciding domains and contexts. Accordingly, when a user's voice having a domain or a context different from that of the utterance history information is input, the second artificial intelligence sub-model may separately process the input user's voice or postpone processing of the user's voice.

That is, in a case of using the artificial intelligence model, the external server 200 may not specifically determine the domain and the context of the user's voice. However, the external server 200 may generate response information, to which the domain and the context of the user's voice are substantially reflected, due to the effect of the sample dialogue pattern or the like used in the training process.

The external server 200 may change the generated response information to a response sound and transmit the response sound to the electronic device 100.

Regarding an artificial intelligence dedicated program according to a second aspect, the electronic device 100 may be used in order to receive a user's voice, identify a user, and provide a response sound to the user's voice. In such a case, the electronic device 100 may identify a user who uttered an input user's voice and transmit the input user's voice and the identified user information to the external server 200. The electronic device 100 may receive a response sound to the user's voice from the external server 200 and provide the received response sound to the user.

The external server 200 may generate response information by inputting the user's voice and the user information to an artificial intelligence algorithm. The external server 200 may manage utterance history information based on the user information. For example, when the user's voice of the user A are received, the external server 200 may generate response information by inputting the utterance history information of the user A and the user's voice of the user A to the artificial intelligence algorithm, and when the user's voice of the user B are received, the external server 200 may generate response information by inputting the utterance history information of the user B and the user's voice of the user B to the artificial intelligence algorithm.

The external server may change the generated response information to a response sound and transmit the response sound to the electronic device 100.

An artificial intelligence dedicated program according to a third aspect may be a program including an artificial intelligence model. In such a case, the electronic device 100 may identify a user who uttered an input user's voice and generate response information by inputting the input user's voice and the identified user information to the artificial intelligence model. The electronic device 100 may change the response information to a response sound and output the response sound via a speaker. That is, the electronic device 100 may provide the response sound to the user's voice without the external server 200.

Figure 3A:
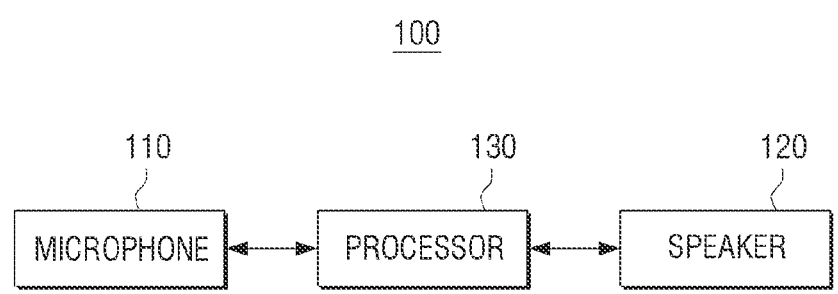
FIG. 3A is a block diagram for explaining a configuration of an electronic device according to an embodiment.

FIG. 3A is a block diagram for explaining a configuration of an electronic device 100 according to an embodiment of the disclosure.

As illustrated in FIG. 3A, the electronic device 100 may include a microphone 110, a speaker 120, and a processor 130.

The electronic device 100 may be a device which receives a user's voice and provides various interactions according to the received user's voice. For example, the electronic device 100 may be a speaker, a notebook, a PC, a tablet PC, or a smartphone. However, there is no limitation thereto, and the electronic device 100 may be any device, as long as it is able to receive a user's voice and provide a response sound according thereto.

In addition, the electronic device 100 may be a device including a display instead of the speaker 120. In such a case, the electronic device 100 may receive a user's voice and provide an interaction according to the received user's voice via the display. In addition, the electronic device 100 may be any device, as long as it is able to receive a user's voice and provide response information to the received user's voice.

The microphone 110 is a component for receiving a user's voice or other sounds and converting it into audio data. The microphone 110 may be electrically connected to the processor 130 and receive a user's voice under the control of the processor 130.

The microphone 110 may include a plurality of sub-microphones. For example, the microphone 110 may include one sub-microphone at each of front, back, right, and left portions of the electronic device 100. However, there is no limitation thereto, and the electronic device 100 may include only one microphone 110.

The speaker 120 is a component which outputs not only various pieces of audio data but also various alerts or voice messages. The speaker 120 may be electrically connected to the processor 130 and output a response sound under the control of the processor 130.

The speaker 120 may include a plurality of sub-speakers. For example, the speaker 120 may include one sub-speaker at each of right and left portions of the electronic device 100. However, there is no limitation thereto and the electronic device 100 may include only one speaker 120.

The processor 130 may generally control the operations of the electronic device 100.

According to an embodiment, the processor 130 may be implemented as a digital signal processor (DSP), a microprocessor, or a time controller (TCON). However, there is no limitation thereto, and the processor 130 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 130 may be implemented as System on Chip (SoC) or large scale integration (LSI) including the processing algorithm or may be implemented in form of a Field Programmable gate array (FPGA).

When a first user's voice is input via the microphone 110, the processor 130 may identify a user who uttered the first user's voice and provide a first response sound obtained by inputting the first user's voice to an artificial intelligence model trained through an artificial intelligence algorithm via the speaker 120.

The artificial intelligence model may be stored in the electronic device 100, and in such a case, the processor 130 may obtain the first response sound by inputting the first user's voice to the artificial intelligence model.

In addition, the artificial intelligence model may be stored in the external server 200, and in such a case, the processor 130 may transmit the first user's voice to the external server 200 and receive the first response sound obtained by inputting the first user's voice to the artificial intelligence model from the external server 200.

When a second user's voice is input via the microphone 110, the processor 130 may identify a user who uttered the second user's voice, and if the user who uttered the first user's voice is the same as the user who uttered the second user's voice, the processor 130 may provide a second response sound obtained by inputting the second user's voice and the utterance history information to the artificial intelligence model via the speaker 120.

For example, the processor 130 may receive the second user's voice uttered by the user who uttered the first user's voice, and in such a case, the processor 130 may provide the second response sound obtained by inputting not only the second user's voice but also the utterance history information to the artificial intelligence model. That is, the second response sound may be obtained by reflecting not only the currently input user's voice, but also all of the previously input user's voice and response information according to user's voice.

The electronic device 100 may further include a camera, and the processor 130 may identify a user based on at least one of an image captured by the camera or a user's voice input via the microphone.

Specifically, the processor 130 may identify the user who uttered the first user's voice by identifying a face of the user included in the image for a period of time during which the first user's voice is input.

In addition, the processor 130 may identify the user who uttered the first user's voice based on a shape of mouth of a user included in the image for a period of time during which the first user's voice is input.

For example, the processor 130 may capture an image by the camera in real time, and identify a user who changed the shape of mouth among a plurality of users included in an image which is being captured in real time for a period of time during which the first user's voice is input, as the user who uttered the first user's voice.

If the shape of mouth of the identified user included in the image is changed for a period of time during which the second user's voice is input is changed, the processor 130 may identify that the user who uttered the first user's voice is the same as the user who uttered the second user's voice.

In addition, the processor 130 may identify whether or not the users are the same by using the speaker 120. For example, the speaker 120 may include a plurality of sub-speakers, and the processor 130 may identify a position of a user who uttered a first user's voice by using the plurality of sub-speakers, when the first user's voice is input.

When a second user's voice is input, the processor 130 may identify a position of a user who uttered the second user's voice by using the plurality of sub-speakers and determine whether or not the user has changed by comparing the position of the user identified previously.

In addition, the processor 130 may identify the user through a voiceprint of a user's voice. For example, the electronic device 100 may further include a storage electrically connected to the processor 130 and the processor 130 may execute frequency analysis of each of a plurality of user's voices and store frequency characteristics of each of the plurality of user voices in the storage. Then, when the first user's voice is input, the processor 130 may execute frequency analysis of the first user's voice and identify a user who uttered the first user's voice based on information stored in the storage. The processor 130 may execute the same operation with respect to the second user's voice and determine whether or not the user is the same as the identified user.

The operation of using the voiceprint may also be executed by the external server 200. In such a case, the electronic device 100 may not execute the operation of identifying the user and may transmit the input user's voice to the external server 200. The external server 200 may identify a user who uttered the received user's voice by executing the frequency analysis of the received user's voice.

In addition, the processor 130 may not identify the user who uttered the input user's voice but may classify gender, kid/adult/elderly person, and identify regions, and the like. For example, when the first user's voice is input, the processor 130 may identify that a user who uttered the first user's voice is an adult man and he speaks the standard language. When the second user's voice is input, the processor 130 may identify that a user who uttered the second user's voice is an adult woman and she speaks the standard language. In this case, the processor 130 may identify that the users are not the same.

The classification of gender, kid/adult/elderly person, and the identification of regions, and the like may also be executed by the external server 200. In this case, the electronic device 100 may not execute the operation of identifying the user and may transmit the input user's voices to the external server 200. The external server 200 may classify gender, kid/adult/elderly person, and identify regions, and the like by using the received user's voice and may determine whether or not the users are the same.

In the above, the processor 130 may store the input user's voice and the response sound to the user's voice in the storage as the utterance history information for a predetermined period of time from a point when the user's voice is input. For example, when a user's voice of "How is the weather going to be tomorrow?" is input, the processor 130 may provide a response sound of "Tomorrow's weather will be fine" to the user's voice and store interaction information as the utterance history information in the storage for 10 minutes from the point when the user's voice is input. When an additional user's voice is input from the same user within 10 minutes from the point when the user's voice is input, the processor 130 may provide a response sound obtained by inputting the additional user's voice and the utterance history information to the artificial intelligence model. In addition, when the additional user's voice is input from the same user after 10 minutes from the point when the user's voice is input, the processor 130 may provide a response sound obtained by inputting only the additional user's voice to the artificial intelligence model, without determining whether or not the user who uttered the additional user's voice is the same as the user who uttered the initial user's voice. That is, the processor 130 may determine whether or not the user who uttered the additional user's voice is the same as the user who uttered the initial user's voice, only when the additional user's voice is input within a predetermined period of time from the point when the user's voice is input.

When the additional user's voice is input within the predetermined period of time from the point when the user's voice is input, the processor 130 may change the start point of the predetermined period of time as the point when the additional user's voice is input. For example, when the first user's voice is input at 6 p.m. and the second user's voice is input at 6:05 p.m. which is within the predetermined period of time of 10 minutes from 6 p.m., the processor 130 may store the utterance history information from 6:05 p.m. to 6:15 p.m. which is after the predetermined period of time which is 10 minutes. The utterance history information may include the first user's voice, the first response sound to the first user's voice, the second user's voice, and the second response sound to the second user's voice. That is, when a period of time for storing the utterance history information is extended by the continuous utterance of the user's voice by the user, the processor 130 may maintain the utterance history information to the extended time to be stored in the storage.

However, there is no limitation thereto, and although the period of time for storing the utterance history information is extended by the continuous utterance of the user's voice by the user, the utterance history information until the extended time may not be maintained to be stored in the storage. For example, when the period of time for storing the utterance history information is extended by the continuous utterance of the user's voice by the user, the processor 130 may store only the user's voice and the response sound from a past point before a predetermined period of time from a current point to the current point as the utterance history information. That is, the processor 130 may remove the user's voice which has passed the predetermined period of time from an utterance point and the response sound which has passed the predetermined period of time from a sound providing point from the utterance history information from the storage.

When the electronic device 100 stores the artificial intelligence model, the storage may store the utterance history information for each user in a time sequence. For example, the storage may store utterance history information on Jan. 1, 2017, utterance history information on Jan. 5, 2017 of the user A, utterance history information the user B on Jan. 4, 2017, and the like. The processor 130 may transmit the utterance history information which has passed the predetermined period of time from the utterance history information stored in the storage to the external server 200. The processor 130 may receive the utterance history information transmitted to the external server 200 from the external server 200, if necessary. The processor 130 may extract a keyword or the like of the utterance history information and store the extracted keyword in the storage before transmitting the utterance history information to the external server 200, and may transmit the utterance history information to the external server 200. The extracted keyword may be used when a user searches for past utterance history information later.

For example, when a user utters a user's voice of "Which restaurant was it that we searched to go in Jeju Island about 5 years ago?", the processor 130 may search for Jeju Island and restaurant as keywords from the keywords of 5 years ago and receive corresponding utterance history information from the external server 200. The processor 130 may provide information desired by a user from the utterance history information received from the external server.

The electronic device 100 may further include a storage. When the user who uttered the first user's voice is not the same as the user who uttered the second user's voice, the processor 130 may store the second user's voice in the storage, and when a user's voice is not input from the user who uttered the first user's voice, for a predetermined period of time or longer, the processor 130 may provide a third response sound obtained by inputting the second user's voice to the artificial intelligence model via the speaker 120.

For example, when the user B utters the second user's voice within the predetermined period of time from the point when the user A uttered the first user's voice, the processor 130 may determine whether or not the users are the same, and when it is determined that the users are not the same, the processor 130 may store the second user's voice of the user B in the storage. That is, the processor 130 may postpone providing the response sound to the second user's voice of the user B. When the additional user's voice of the user A is not input until the predetermined period of time passes from the point when the user A has uttered the first user's voice, the processor 130 may provide the response sound to the second user's voice after the predetermined period of time from the point when the user has uttered the first user's voice. The response sound to the second user's voice may be a response sound obtained by inputting the second user's voice to the artificial intelligence model in a state where the utterance history information by the user A is removed.

When the first user's voice is input, the processor 130 may identify the first user who uttered the first user's voice and provide the first response sound obtained by inputting the first user's voice to the artificial intelligence model via the speaker 120, and when the second user's voice is input, the processor 130 may identify the second user who uttered the second user's voice and provide the third response sound obtained by inputting the second user's voice to the artificial intelligence model to be distinct from the first response sound via the speaker 120. That is, the processor 130 may separately process the plurality of user's voices in real time and set providing states of processed results to be distinct from each other.

For example, the processor 130 may provide "Today's weather is fine" as the first response sound to "How is the weather today?" of the user A in a male voice and provide "No movie tonight" as the second response sound to "What movie is on tonight?" of the user B in a female voice. The second response sound may be a response sound obtained only based on the user's voice of the user B without reflecting the utterance history information of the user A.

However, there is no limitation thereto, and the processor 130 may provide the providing states of the response information to the user's voices to be distinct from each other by any methods. For example, the electronic device 100 may further include a display electrically connected to the processor 130, and the processor 130 may display "Today's weather is fine" as the first response to "How is the weather today?" of the user A via the display and provide "No movie tonight" as the second response sound to "What movie is on tonight?" of the user B via the speaker 120.

In addition, the processor 130 may display both of "Today's weather is fine" as the first response to "How is the weather today?" of the user A and "No movie tonight" as the second response to "What movie is on tonight?" of the user B, and may display different background screen colors of the first response and the second response so that the users may identify the target of the response.

When a first additional user's voice is input by the first user, the processor 130 may provide a first additional response sound obtained by inputting the first additional user's voice and first utterance history information corresponding to the first user's voice to the artificial intelligence model via the speaker 120, and when a second additional user's voice is input by the second user, the processor 130 may provide a second additional response sound obtained by inputting the second additional user's voice and second utterance history information corresponding to the second user's voice to the artificial intelligence model via the speaker 120 to be distinct from the first additional response sound.

The processor 130 may display a first UI corresponding to the first user via the display while providing the first additional response sound, and display a second UI corresponding to the second user via the display while providing the second additional response sound.

For example, the processor 130 may display an image of the first user via the display while providing the first additional response sound and may display an image of the second user via the display while providing the second additional response sound.

In a case of providing the response sound for each user by using the external server 200 storing an artificial intelligence algorithm, the processor 130 may transmit the user's voices to the external server 200 together with the identified user information. The external server 200 may generate utterance history information for each user based on the received user information and transmit a response sound obtained by inputting the user's voice and the corresponding utterance history information to the artificial intelligence model to the electronic device 100. The external server 200 may transmit not only the response sound but also the user information of a target of the response sound to the electronic device 100.

The electronic device 100 may provide the response sound based on the received user information to be distinct from the response sound of the other user.

When the user who uttered the first user's voice is not the same as the user who uttered the second user's voice, the processor 130 may obtain a first domain corresponding to the first user's voice and a second domain corresponding to the second user's voice, and when the first domain is the same as the second domain, the processor 130 may provide the second response sound obtained by inputting the second user's voice and the utterance history information to the artificial intelligence model via the speaker 120.

For example, the processor 130 may provide "It will rain today afternoon" as the first response sound to the first user's voice of "How is the weather today?" of the user A via the speaker 120, and when the second user's voice of "Do I need to take umbrella?" of the user B is input, the processor 130 may determine whether or not the users are same. When it is determined that the users are not same, the processor 130 may obtain that both of a domain of the first user's voice and a domain of the second user's voice are information request domains. When it is determined that the domain of the first user's voice is the same as the domain of the second user's voice, the processor 130 may provide the second response sound of "Yes. Take umbrella today" obtained by inputting the second user's voice and the utterance history information to the artificial intelligence model.

In the example described above, when the second user's voice of "Turn the music on" is uttered by the user B, the processor 130 may determine whether or not the users are same. When it is determined that the users are not same, the processor 130 may obtain that the domain of the first user's voice is the information request domain and obtain that the domain of the second user's voice is a device control domain. When it is determined that the domain of the first user's voice is the different from the domain of the second user's voice, the processor 130 may postpone the processing of the second user's voice. In addition, the processor 130 may provide the second response sound of "Turning music on" obtained by inputting only the second user's voice to the artificial intelligence model to be distinct from the first response sound.

In addition, the processor 130 may further consider the context, in addition to the domain. For example, although the domain of the first user's voice is same as the second user's voice, if the contexts thereof are different from each other, the processor 130 may postpone the processing of the second user's voice. In addition, the processor 130 may provide the second response sound obtained by inputting only the second user's voice to the artificial intelligence model to be distinct from the first response sound.

When the second user's voice is input within a first predetermined period of time from the point when the first user's voice is input, the user who uttered the first user's voice is the same as the user who uttered the second user's voice, and the first domain corresponding to the first user's voice is different from the second domain corresponding to the second user's voice, the processor 130 may store the first user's voice in the storage without providing the first response sound, and provide the third response sound obtained by inputting the second user's voice to the artificial intelligence model via the speaker. The first predetermined period of time may be shorter than the period of time during which the storage of the utterance history information described above is maintained.

For example, when the first user's voice of "Turn TV on" of the user A is input and then the second user's voice of "Where is the place of the appointment today?" with the domain different from that of the first user's voice of the same user A is input within 1 second, the processor 130 may store the first user's voice in the storage and provide "In front of City Hall" as the third response sound to the second user's voice.

When the user's voice corresponding to the second domain is not input from the user for a second predetermined period of time or longer, the processor 130 may provide the first response sound obtained by inputting the first user's voice stored in the storage to the artificial intelligence model via the speaker 120. The second predetermined period of time may be same as the period of time for maintaining the storage of the utterance history information described above and longer than the first predetermined period of time. However, there is no limitation thereto, and the second predetermined period of time may not correlate to the period of time for maintaining the storage of the utterance history information described above and may be longer than the first predetermined period of time. In addition, in the above example, the processor 130 may determine whether or not the context of the second user's voice is the same as the context of the first user's voice, and when the contexts are different, the processor 130 may store the first user's voice in the storage without providing the first response sound, and may provide the third response sound obtained by inputting the second user's voice to the artificial intelligence model via the speaker.

The artificial intelligence algorithm stored in the electronic device 100 or the external server 200 may include at least one of a first artificial intelligence algorithm for obtaining a domain of a user's voice or a second artificial intelligence algorithm for determining whether or not the contexts are the same between the user's voices. In this case, the determination whether or not the domains and the contexts are the same may be performed before obtaining the response information.

In addition, the artificial intelligence algorithm stored in the electronic device 100 or the external server 200 may not include the separate artificial intelligence algorithm for obtaining the domain of the user's voice or determining whether or not the contexts are the same between the user's voices. In this case, the artificial intelligence algorithm may provide a response sound obtained by reflecting at least one of the domain or the context as it is.

Figure 3B:
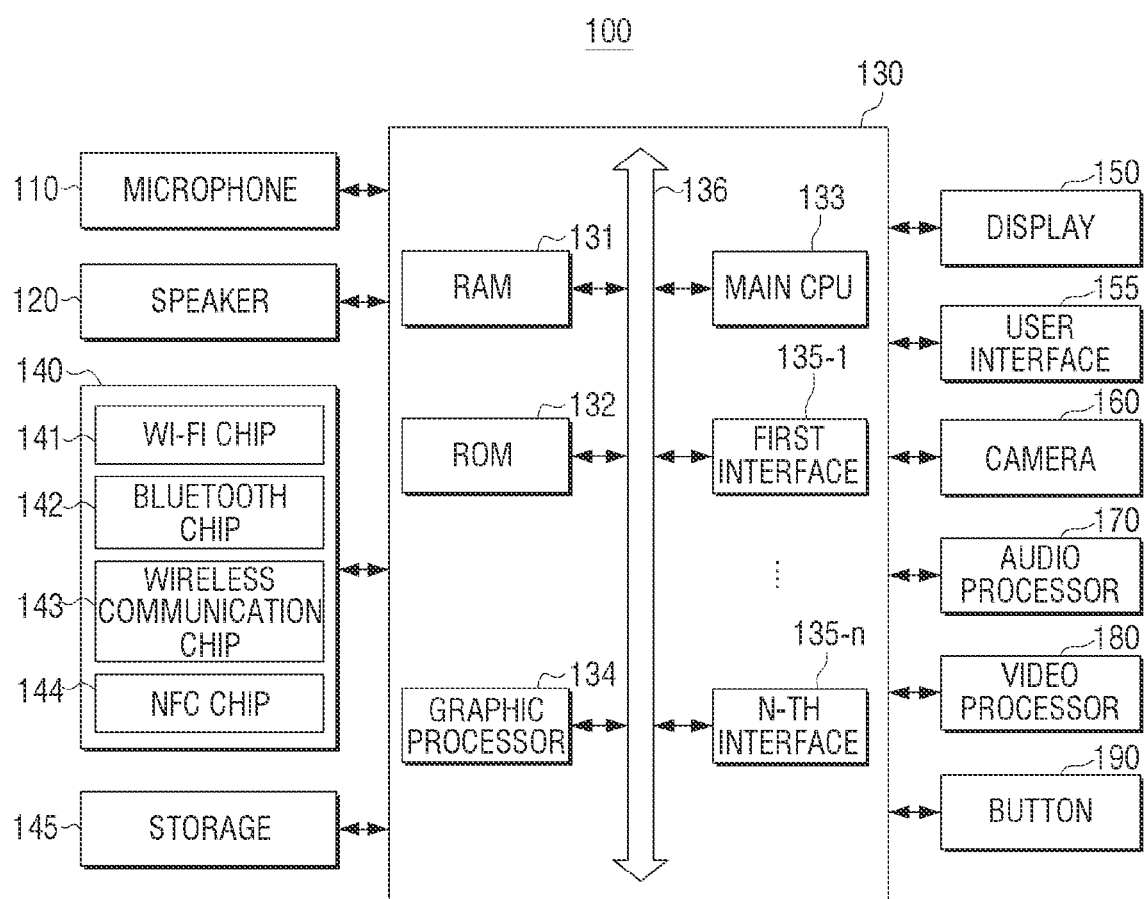
FIG. 3B is a block diagram illustrating a specific configuration of the electronic device according to an embodiment.

FIG. 3B is a block diagram illustrating a specific configuration of the electronic device 100 according to an embodiment of the disclosure. The electronic device 100 may include the microphone 110, the speaker 120, and the processor 130. In addition, referring to FIG. 3B, the electronic device 100 may further include a communicator 140, a storage 145, a display 150, a user interface 155, a camera 160, an audio processor 170, a video processor 180, and a button 190. The specific description of the components illustrated in FIG. 3B which are overlapped with the components illustrated in FIG. 3A will be omitted.

The processor 130 generally controls the operations of the electronic device 100 by using various programs stored in the storage 145.

Specifically, the processor 130 includes a RAM 131, a ROM 132, a main CPU 133, a graphic processor 134, first to n-th interfaces 135-1 to 135-$n$, and a bus 136.

The RAM 131, the ROM 132, the main CPU 133, the graphic processor 134, and the first to n-th interfaces 135-1 to 135-$n$ may be connected to each other via the bus 136.

The first to n-th interfaces 135-1 to 135-$n$ are connected to the various components described above. One of the interfaces may be a network interface connected to an external device via the network.

The main CPU 133 may execute the booting by using the O/S stored in the memory 145 by accessing the storage 145. The main CPU 133 may execute various operations by using various programs and the like stored in the storage 145.

The ROM 132 may store a set of instructions for system booting. If a turn-on instruction is input to supply power, the main CPU 133 copies the O/S stored in the storage 145 to the RAM 131 and boots the system up by executing the O/S according to the instruction stored in the ROM 132. If the booting is completed, the main CPU 133 copies various application programs stored in the storage 145 to the RAM 131 and execute various operations by executing the application programs copied to the RAM 131.

The graphic processor 134 generates a screen including various objects such as icons, images, texts, and the like by using an operating unit (not shown) and a rendering unit (not shown). The operating unit (not shown) may calculate attribute values such as a coordinate value of each object to be displayed, a shape, a size, a color and the like thereof according to the layout of the screen by using the received control command. The rendering unit (not shown) may generate screens having various layouts including objects based on the attribute values calculated by the operating unit (not shown). The screen generated in the rendering unit (not shown) may be displayed in a display region of the display 150.

The operation of the processor 130 described above may be performed by programs stored in the storage 145.

The storage 145 may store various pieces of data such as an operation system (O/S) software module for operating the electronic device 100, an artificial intelligence module, an artificial intelligence dedicated program module, an utterance history module, a user identification module, a domain identification module, and a context identification module, and the like.

The communicator 140 is a component which executes communication with various types of external devices according to various types of communication systems. The communicator 140 includes a Wi-Fi chip 141, a Bluetooth chip 142, a wireless communication chip 143, and an NFC chip 144. The processor 130 executes communication with various external devices by using the communicator 140.

The Wi-Fi chip 141 and the Bluetooth chip 142 execute the communication in a Wi-Fi system and a Bluetooth system, respectively. When using the Wi-Fi chip 141 or the Bluetooth chip 142, various pieces of connection information such as SSID or session key may be transmitted or received first to allow the communication connection by using these, and then various pieces of information may be transmitted and received. The wireless communication chip 143 means a chip executing the communication based on various communication standards such as IEEE, Zigbee, 3rd Generation (3G), 3rd Generation Partnership Project (3GPP), and Long Term Evolution (LTE). The NFC chip 144 means a chip operated in a near field communication (NFC) system using 13.56 MHz band among frequency bands of 135 kHz, 13.56 MHz, 433 MHz, 860 to 960 MHz, 2.45 GHz, and the like.

In addition, the communicator 140 may further include a wired communication interface such as HDMI, MHL, USB, DP, Thunderbolt, RGB, D-SUB, DVI, or the like. The processor 130 may be connected to the external server 200 via the wired communication interface of the communicator 140.

The display 150 may be implemented as various types of displays such as liquid crystal display (LCD), organic light emitting diodes (OLED) display, plasma display panel (PDP), and the like. The display 150 may also include a driving circuit or a backlight unit which may be implemented in a form of a-si TFT, a low temperature poly silicon (LTPS) TFT, or an organic TFT (OTFT). The display 150 may be implemented as a touch screen by combining with a touch detector.

The user interface 155 receives various user interactions. The user interface 155 may be implemented in various forms according to the implementation example of the electronic device 100. For example, the user interface 155 may be a button provided on the electronic device 100, a microphone receiving a user's voice, or a camera detecting a user's motion. In addition, when the electronic device 100 is implemented as a touch-based terminal device, the user interface 155 may be implemented in a form of a touch screen forming a layer structure with a touch pad. In this case, the user interface 155 may be used as the display 150 described above.

The audio processor 170 is a component executing processing of audio data. The audio processor 170 may execute various processing such as decoding, amplification, or noise filtering regarding the audio data.

The video processor 180 is a component executing processing regarding video data. The video processor 180 may execute various image processing such as decoding, scaling, noise filtering, frame rate conversion, or resolution conversion regarding the video data.

The button 190 may be various types of buttons such as a mechanical button, a touch pad, or a wheel formed in any region of a front portion, a side portion, or a rear portion of the appearance of the main body of the electronic device 100.

Through the method described above, the processor 130 may provide the response information with the maintained context, even if the user is changed.

Hereinafter, the operations of the electronic device 100 will be specifically described with reference to the drawings.

Figure 4A:
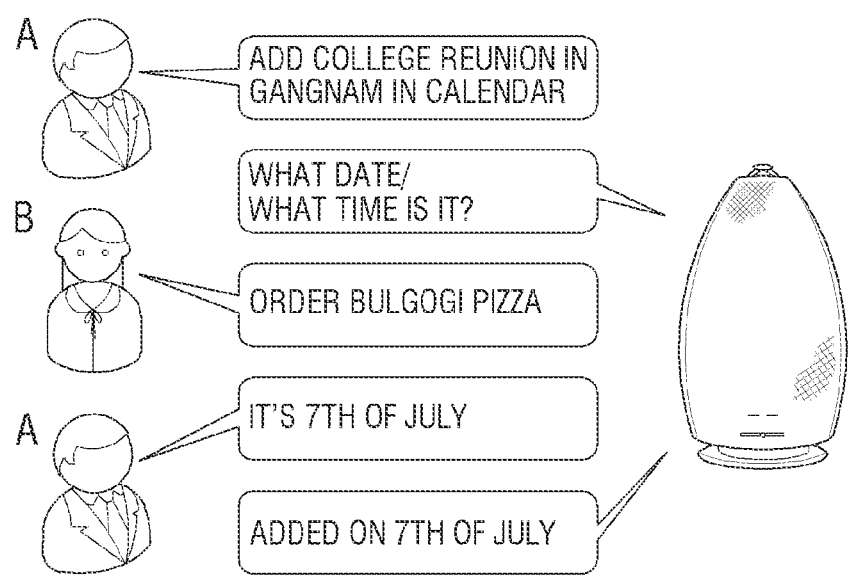
FIGS. 4A and 4B are views for explaining postponement of processing of a voice of a user among a plurality of users according to an embodiment.
Figure 4B:
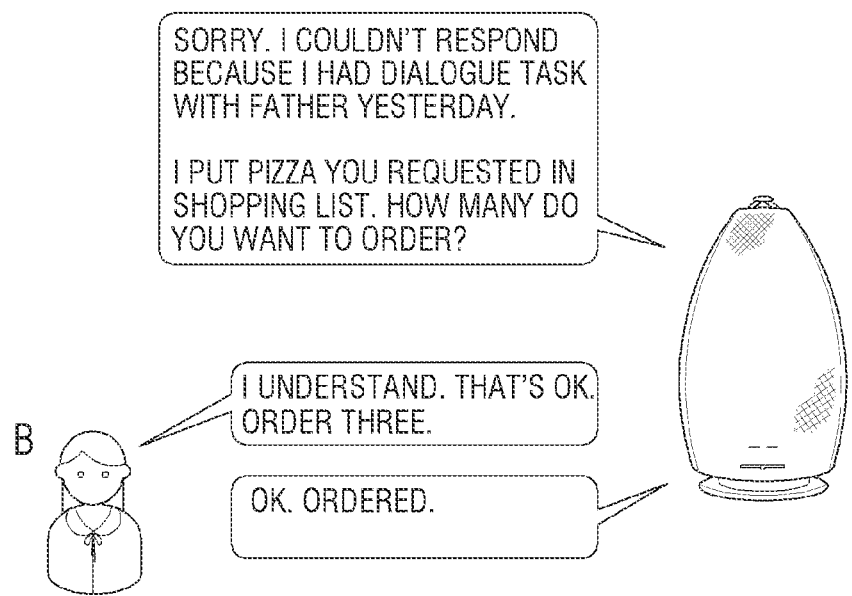

FIGS. 4A and 4B are views for explaining postponement of processing of a voice of a user among a plurality of users according to an embodiment of the disclosure.

Referring to FIG. 4A, when the first user's voice of "Add college reunion in Gangnam in calendar" of the user A is input, the processor 130 may identify the user A and provide the first response sound of "What date/what time is it?" to the first user's voice.

When the second user's voice of "Order Bulgogi Pizza" of the user B is input, the processor 130 may identify the user B and store the second user's voice in the storage 145, because the identified user B is different from the user A. The processor 130 may also store not only the second user's voice, but also the information regarding the user B who uttered the second user's voice in the storage 145.

When the third user's voice of "It's 7th of July" of the user A is input, the processor 130 may identify the user A and provide the second response sound of "Added on 17th of July" to the third user's voice, because the user is same as the user A who uttered the first user's voice.

Referring to FIG. 4B, when it is determined that the interaction with the user A has ended, the processor 130 may provide the third response sound of "Sony. I couldn't respond because I had dialogue task with father yesterday. I put pizza you requested in shopping list. How many do you want to order?" to the second user's voice. At this time, the processor 130 may provide the third response sound after detecting that the second user is nearby.

The processor 130 may determine that the interaction with the user A has ended, if the user A is not detected or a user's voice is not input from the user A for the predetermined period of time.

Later, when a fourth user's voice of "I understand. That's ok. Order three" of the user B is input, the processor 130 may identify the user B and provide a fourth response sound of "Yes. Ordered" to the fourth user's voice, because it is the same as the user B who uttered the second user's voice.

Figure 5A:
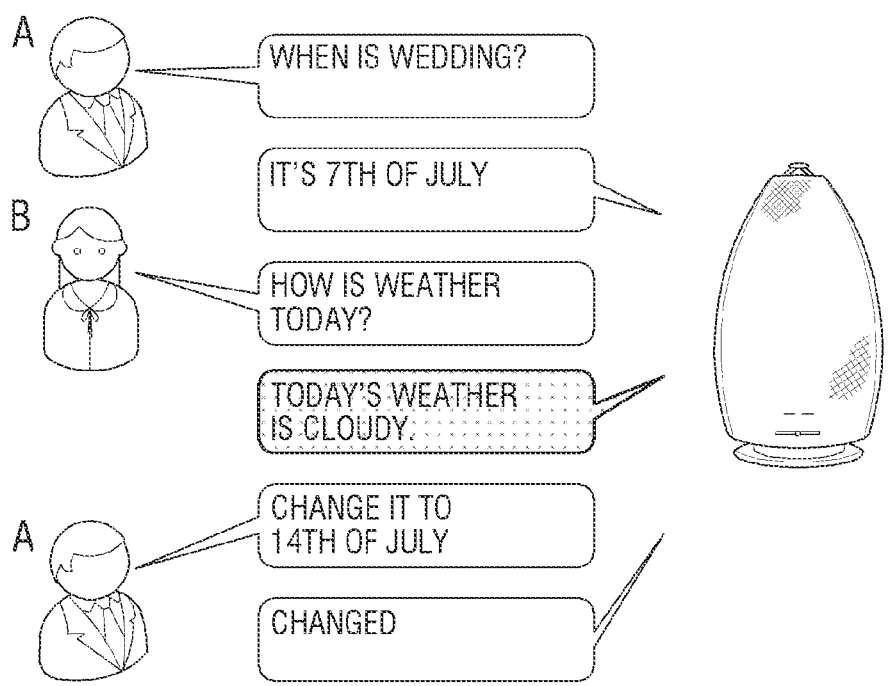
FIGS. 5A to 5C are views for explaining a method for real-time simultaneous processing of a plurality of user's voices according to an embodiment.
Figure 5B:
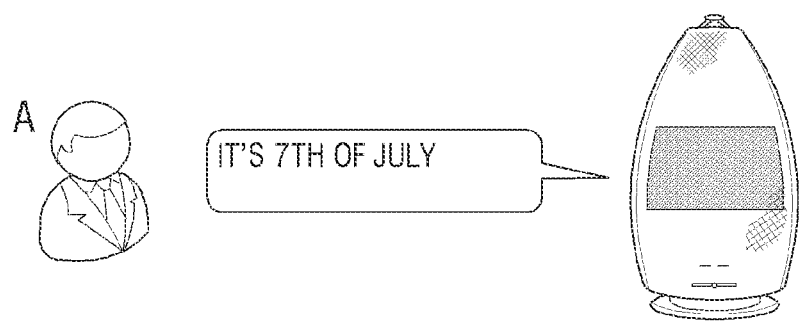
Figure 5C:
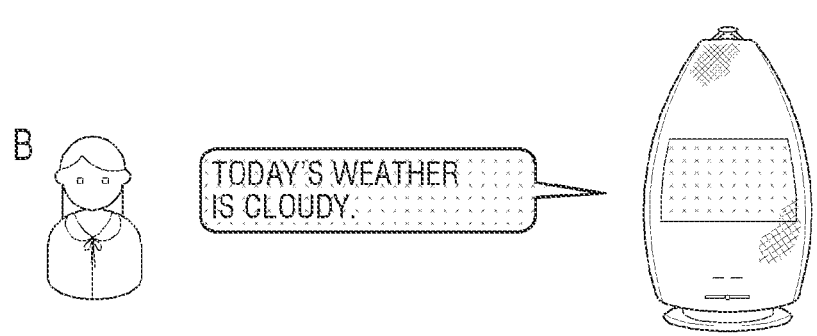

FIGS. 5A to 5C are views for explaining a method for real-time simultaneous processing of a plurality of user's voices according to an embodiment of the disclosure.

Referring to FIG. 5A, when the first user's voice of "When is wedding?" of the user A is input, the processor 130 may identify the user A and provide the first response sound of "It's 7th of July" to the first user's voice.

Then, when the second user's voice of "How is the weather today?" of the user B is input, the processor 130 may identify the user B and provide the second response sound of "Today's weather is cloudy" by considering only the second user's voice, regardless of the first utterance history information including the first user's voice and the first response sound, because the identified user B is different from the user A.

At this time, the processor 130 may provide the second response sound in a way different from the first response sound. For example, the processor 130 may provide the first response sound in a male voice and provide the second response sound in a female voice.

In addition, when the identified user is a user stored in the storage 145 in advance, the processor 130 may provide the response sound including a user name, ID, or the like. For example, if the user A is stored in the storage 145 in advance as ID of "Park" and the user B is stored in the storage 145 in advance as ID of "Kim", the processor 130 may provide the first response sound of "Park. It's 7th of July" and the second response sound of "Kim. Today's weather is cloudy".

In addition, referring to FIGS. 5B and 5C, the processor 130 may control the display 150 to display colors different from each other according to the target of the response sound to be provided. In addition, the electronic device 100 may include an LED and control the LED to emit light with colors different from each other according to the target of the response sound to be provided. Further, the electronic device 100 may include a plurality of LEDs and the processor 130 may control the LED so that one of the plurality of LEDs is turned on according to the target of the response sound to be provided.

When the third user's voice of "Change it to 14th of July" of user A is input, the processor 130 may identify the user A and provide the third response sound of "Changed" to the third user's voice based on the first utterance history information, because the user is the same as the user A uttered the first user's voice.

Hereinabove, FIGS. 4A and 4B show the embodiment in which only one user's voice is processed although there are a plurality of user's voices, and FIGS. 5A to 5C show the embodiment in which each input of the plurality of user's voices is separately processed. The electronic device 100 may provide a personal mode as shown in FIGS. 4A and 4B and a common mode as shown in FIGS. 5A to 5C, and the processor 130 may be operated in the personal mode or the common mode according to the mode selection of the user.

Figure 6:
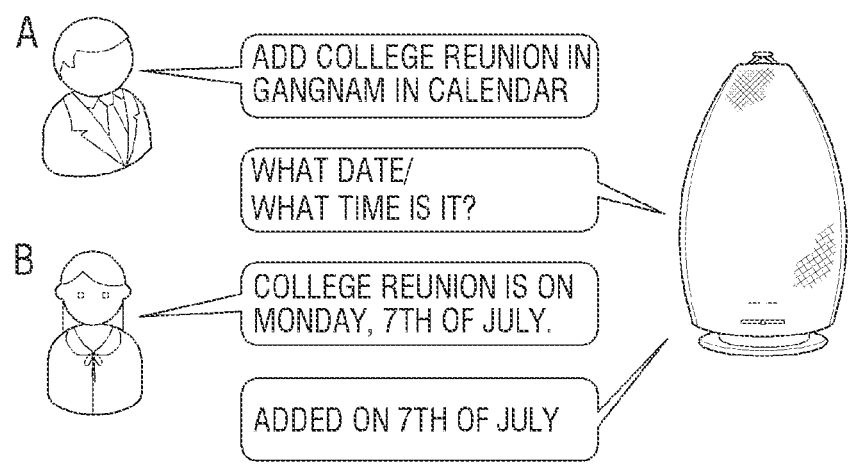
FIG. 6 is a view for explaining a collective interaction with a plurality of users according to an embodiment.

FIG. 6 is a view for explaining a collective interaction with a plurality of users according to an embodiment of the disclosure.

Referring to FIG. 6, when the first user's voice of "Add college reunion in Gangnam in calendar" of the user A is input, the processor 130 may identify the user A and provide the first response sound of "What date/what time is it?" to the first user's voice.

When the second user's voice of "The college reunion is on Monday, 7th of July" of the user B is input, the processor 130 may identify the user B and provide the second response sound of "Added on 7th of July" by considering the first utterance history information including the first user's voice and the first response sound and the second user's voice, because although the identified user B is different from the user A, the context of the first user's voice is the same as the context of the second user's voice.

If it is not clear whether or not the context of the first user's voice is the same as the context of the second user's voice, the processor 130 may provide a response sound inquiring the users. For example, if it is not clear whether or not the context of the first user's voice is the same as the context of the second user's voice, the processor 130 may provide the third response sound of "Is the college reunion on Monday, 7th of July, the college reunion in Gangnam?".

When the contexts of the plurality of user's voices are changed while executing the collective interaction as shown in FIG. 6, the processor 130 may be operated in a common mode. In addition, when the contexts between the user's voices of the plurality of users coincide with each other during the operation in the common mode, the processor 130 may execute the collective interaction.

Figure 7:
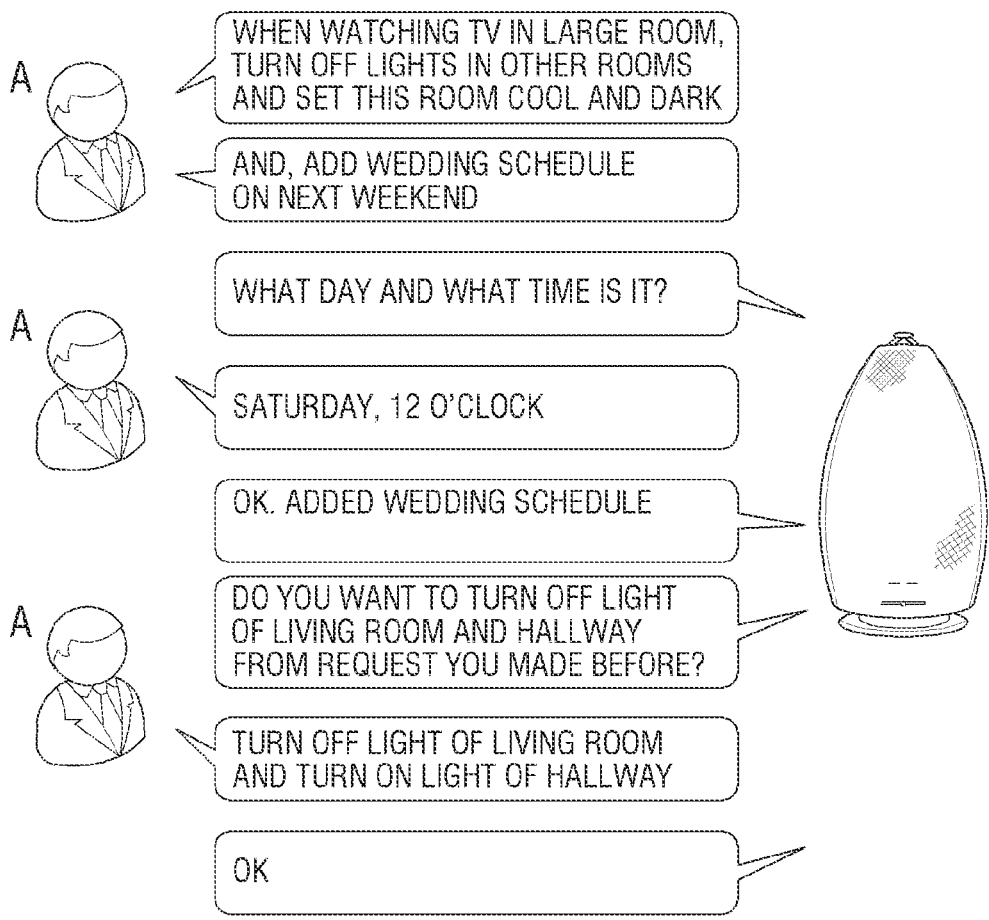
FIG. 7 is a view for explaining an operation when a plurality of user's voices respectively corresponding to a plurality of domains of the same user are input, according to an embodiment.

FIG. 7 is a view for explaining an operation when a plurality of user's voices respectively corresponding to a plurality of domains of the same user are input, according to an embodiment of the disclosure.

Referring to FIG. 7, when the first user's voice of "Turn the light off in another room when watching TV in the large room and make this room cool and dark" of the user A is input and then the second user's voice of "Add wedding schedule on next weekend" is immediately input, the processor 130 may identify the user A who uttered the first user's voice and the second user's voice and may provide the first response sound of "What day, What time is it?" to the second user's voice which is input late. At this time, the processor 130 may store the first user's voice in the storage 145. In addition, the processor 130 may store not only the first user's voice, but also the information of the user A who uttered the first user's voice in the storage 145.

When the third user's voice of "Saturday, 12 o'clock" of the user A is input, the processor 130 may identify the user A and provide the second response sound of "OK. Added wedding schedule" to the third user's voice based on the first utterance history information including the second user's voice and the first response sound, because the identified user is the same as the user A who uttered the first user's voice.

The processor 130 may determine that the interaction with the user has ended as the specific operation according to the user's voice is completed. In the above example, the processor 130 may determine that the first interaction with the user A has ended as the adding the wedding schedule is completed. However, there is no limitation thereto, and the processor 130 may also determine that the interaction with the user has ended, if the user is not detected or the user's voice is not input from the same user for a predetermined period of time or longer. In addition, the processor 130 may also determine that the interaction with the user has ended, according to an end command of the user.

When it is determined that the interaction with the user has ended, the processor 130 may obtain the user's voice stored in the storage 145 and start a new interaction. In the above example, the processor 130 may obtain the first user's voice stored in the storage 145 and provide the third response sound of "Do you want to turn off light of living room and hallway from the request you made before?" to the first user's voice.

At that time, if the user who uttered the user's voice stored in the storage 145 is detected, the processor 130 may start a new interaction. In the above example, although the first user's voice stored in the storage 145 is obtained, if the user A who uttered the first user's voice is not detected, the processor 130 may not start a new interaction.

When the fourth user's voice of "Turn off light of living room and turn on light of hallway" of the user A is input, the processor 130 may provide the fourth response sound of "OK" to the fourth user's voice.

Figure 8A:
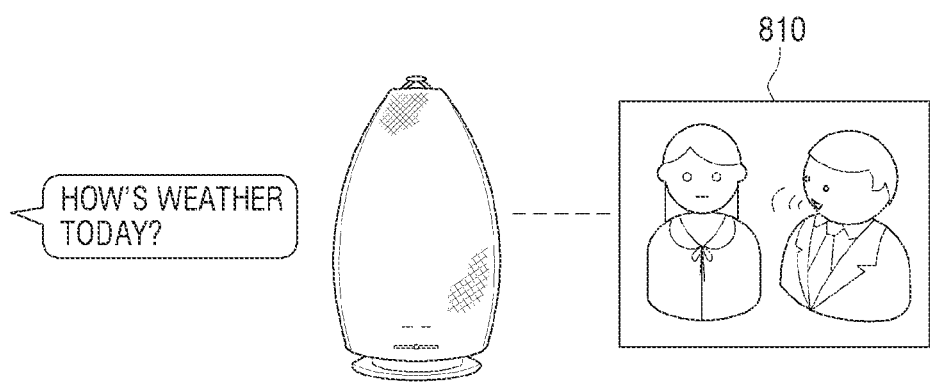
FIGS. 8A and 8B are views for explaining a method for identifying a user who uttered a user's voice according to an embodiment.
Figure 8B:
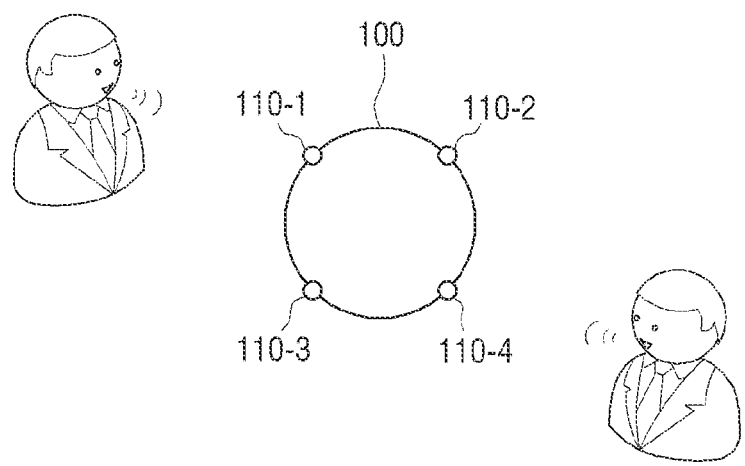

FIGS. 8A and 8B are views for explaining a method for identifying a user who uttered a user's voice according to an embodiment of the disclosure.

Referring to FIG. 8A, when the user's voice is input, the processor 130 may identify the user from an image 810 captured by the camera 160. In addition, when the user's voice is input, the processor 130 may identify a user changing a shape of mouth from the image 810 captured by the camera 160 as the user who uttered the user's voice.

Further, referring to FIG. 8B, the speaker 110 may include a plurality of sub-speakers 110-1, 110-2, 110-3, and 110-4 installed to be spaced apart from each other, and the processor 130 may estimate a first position where the user's voice has uttered by using the plurality of sub-speakers 110-1, 110-2, 110-3, and 110-4. When the additional user's voice is input, the processor 130 may estimate a second position where the additional user's voice has uttered and identify the user as the same user, if the second position is within a predetermined distance from the first position.

Figure 9A:
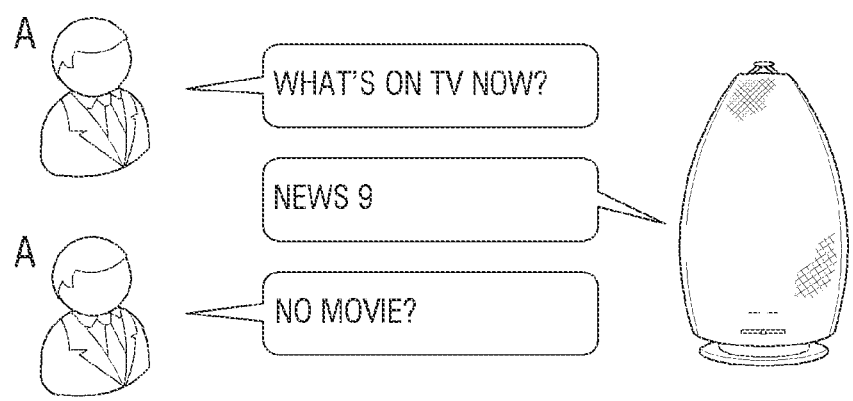
FIGS. 9A and 9B are views for explaining additional training of an artificial intelligence model according to an embodiment.
Figure 9B:
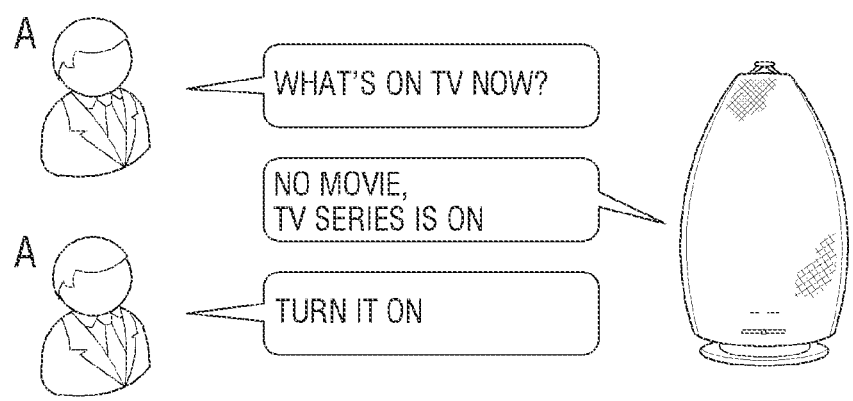

FIGS. 9A and 9B are views for explaining additional training of an artificial intelligence model according to an embodiment of the disclosure.

As described above, the artificial intelligence model stored in the electronic device 100 of the external server 200 may be trained in advance by using a sample dialogue pattern or the like. Hereinafter, the artificial intelligence model may be retrained based on the interaction with the user. The retraining means updating the artificial intelligence model trained with the sample dialogue pattern by additionally training the artificial intelligence model based on the interaction with the user.

Referring to FIG. 9A, when the first user's voice of "What's on TV now?" of the user A is input, the processor 130 may provide the first response sound of "News 9" to the first user's voice.

When the second user's voice of "No movie?" of the user A is input, the processor 130 may execute the retraining of the artificial intelligence model based on the first user's voice, the first response sound, and the second user's voice.

For example, the retrained artificial intelligence model may be an artificial intelligence model obtained by reflecting a point that the user prefers movie.

The same situation as in FIG. 9A is assumed in FIG. 9B. FIG. 9A is a view illustrating that the artificial intelligence model before the retraining is used and FIG. 9B is a view illustrating that the retrained artificial intelligence model is used.

Referring to FIG. 9B, when the retrained artificial intelligence model is used and the first user's voice of "What's on TV now? Of the user A is input, the processor 130 may provide the second response sound of "No movie, TV series is on" to the first user's voice.

In FIGS. 9A and 9B, it is described that the electronic device 100 stores the artificial intelligence model for convenience of description, but the above retraining method may be applied in the same manner to a case where the artificial intelligence model is stored in the external server 200.

Figure 10:
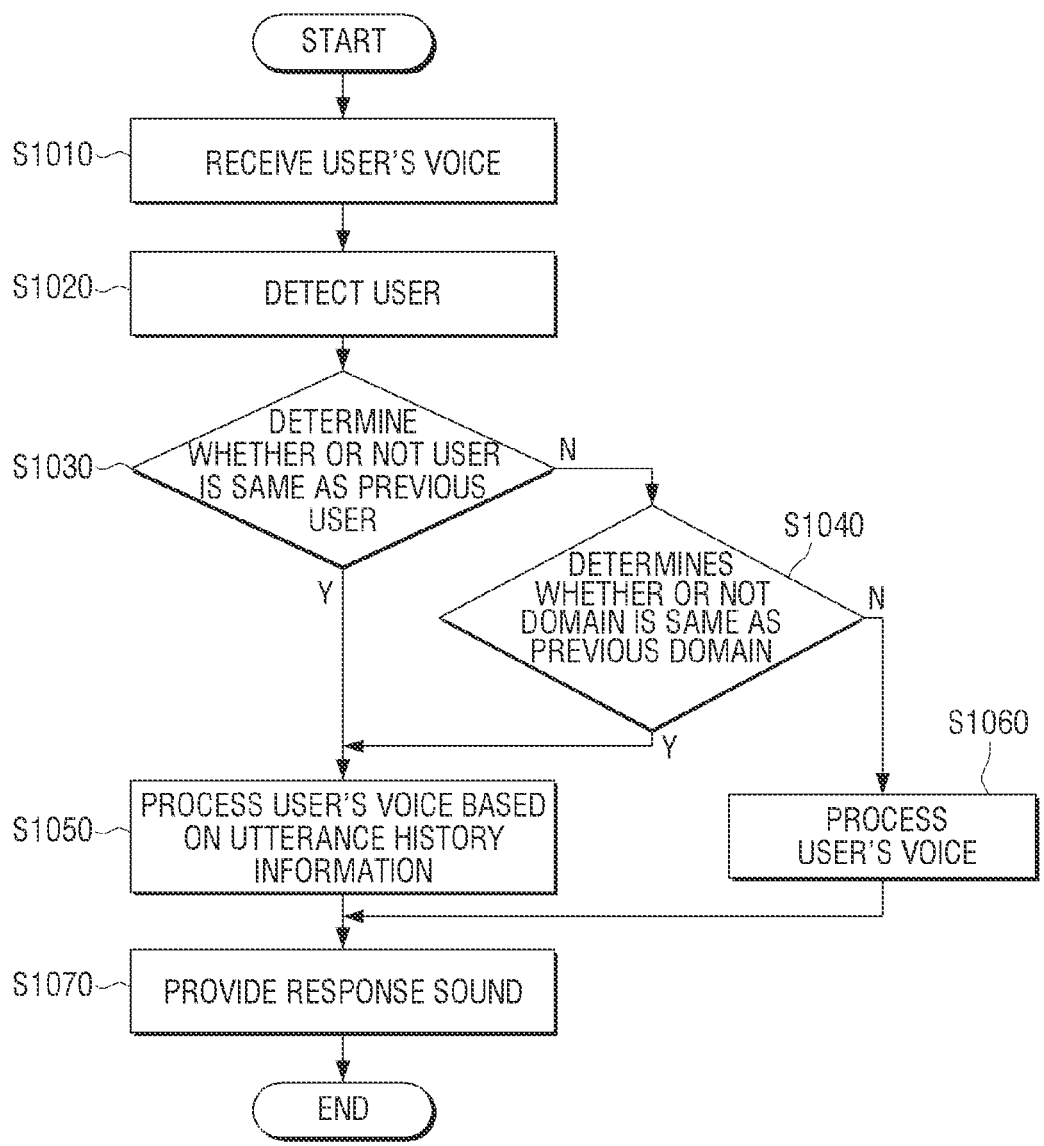
FIG. 10 is a flowchart for explaining operations of an electronic device storing an artificial intelligence model according to an embodiment.

FIG. 10 is a flowchart for explaining operations of the electronic device 100 storing the artificial intelligence model according to an embodiment of the disclosure.

The processor 130 receives a user's voice (S1010). The processor 130 detects a user (S1020). The processor 130 determines whether or not the user is the same as a previous user (S1030) and processes the user's voice based on utterance history information, if the user is the same user (S1050).

If the user is not the same user, the processor determines whether or not a domain is the same as a previous domain (S1040), and if the domain is the same, the processor 130 processes the user's voice based on the utterance history information (S1050). The processor 130 processes the user's voice without considering the utterance history information, if the domain is not same (S1060).

The processor 130 provides the response sound to the voice processing (S1070).

Figure 11:
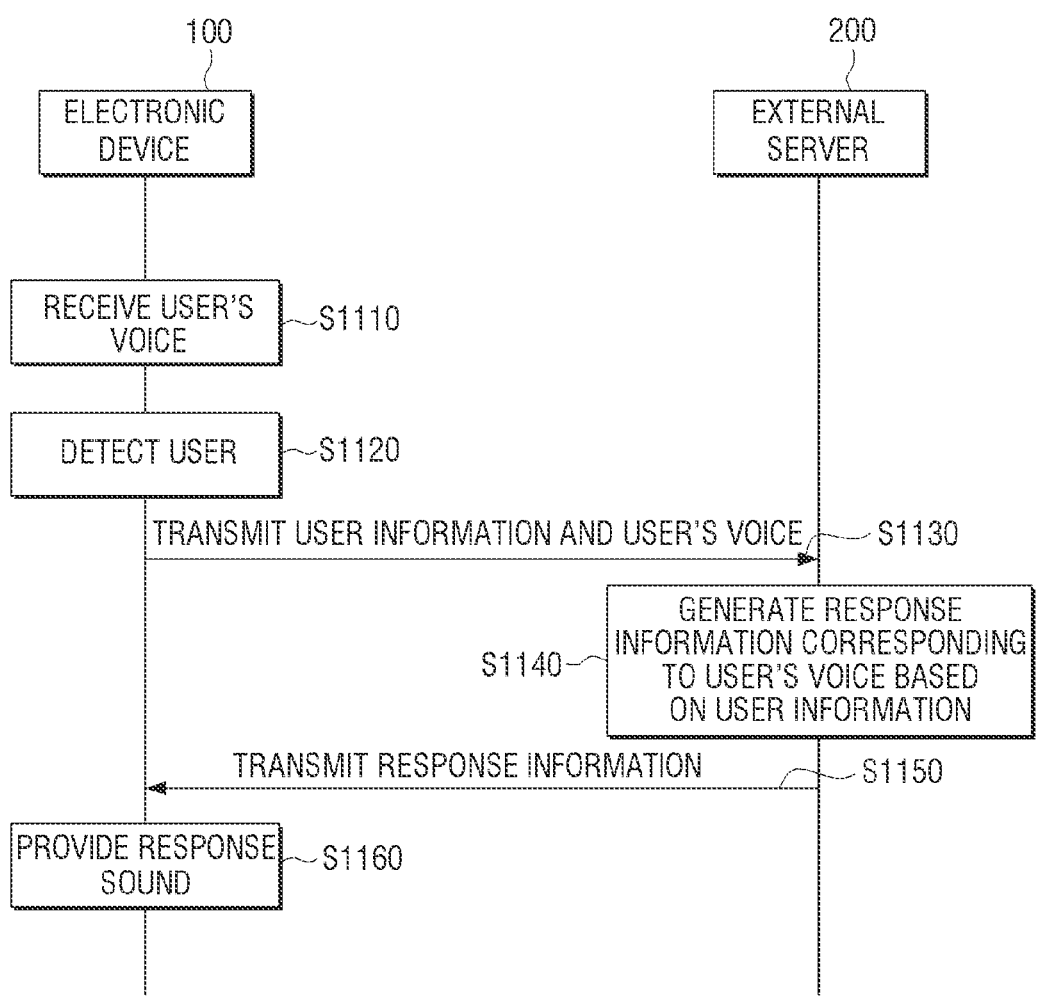
FIG. 11 is a sequence diagram for explaining operations of the electronic device and an external server storing an artificial intelligence model according to an embodiment.

FIG. 11 is a sequence diagram for explaining operations of the electronic device 100 and the external server 200 storing the artificial intelligence model according to an embodiment of the disclosure.

The electronic device 100 receives the user's voice (S1110) and detects the user (S1120). The electronic device 100 transmits the user information and the user's voice to the external server 200.

The external server 200 generates response information corresponding to the user's voice based on the user information (S1140). The external server 200 transmits the response information to the electronic device 100 (S1150).

The electronic device 100 provides the response sound (S1160).

Figure 12:
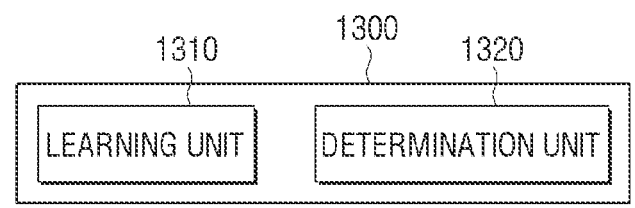
FIG. 12 is a block diagram illustrating a configuration of an external server for training and using an artificial intelligence model which provides a response to a user's request according to an embodiment.

FIG. 12 is a block diagram illustrating a configuration of an external server 1300 for training and using an artificial intelligence model which provides a response to a user's request according to an embodiment of the disclosure.

Referring to FIG. 12, the external server 1300 may include at least one of a learning unit 1310 or a response unit 1320. The external server 1300 of FIG. 12 may correspond to the external server 200 of FIG. 2.

The learning unit 1310 may generate or train an artificial intelligence model having a criterion for providing a response to the user's voice by using learning data. The learning unit 1310 may generate a determination model having a determination criterion by using collected learning data.

For example, the learning unit 1310 may perform training to obtain information of a voice and an image including a response to the user's voice by using the user's voice as the learning data. In addition, the learning unit 1310 may generate, train, or update the artificial intelligence model for providing information of a voice and an image including the response to the user's voice by using the user's voice and state information of the electronic device as the learning data.

The response unit 1320 may obtain information of a voice and an image including a response to a predetermined user's voice by using predetermined data as input data of the trained artificial intelligence model.

For example, the response unit 1320 may obtain (or predict or infer) the information of the voice and the image including the response to the user's voice by using the user's voice and the state information of the electronic device as the input data of the trained artificial intelligence model.

In an embodiment of the disclosure, the learning unit 1310 and the response unit 1320 may be included in the external server 1300, but this is merely an embodiment, and these may be mounted in the electronic device 100. Specifically, at least a part of the learning unit 1310 and at least a part of the response unit 1320 may be implemented as a software module or manufactured in a form of at least one hardware chip and mounted on the electronic device 100. For example, at least one of the learning unit 1310 or the response unit 1320 may be manufactured in a form of a dedicated hardware chip for artificial intelligence (AI) and may be manufactured as a part of the conventional generic-purpose processor (e.g., CPU or application processor) or a graphic dedicated processor (e.g., GPU) and mounted on various electronic devices described above. The dedicated hardware chip for artificial intelligence is a dedicated processor specialized in possibility calculation and may rapidly process the calculation operations in the artificial intelligence field such as machine learning with higher performance of parallel processing than the conventional generic-purpose processor. If the learning unit 1310 and the response unit 1320 are implemented as software module (or program module including instructions), the software module may be stored in a non-transitory computer readable medium. In this case, the software module may be provided by an operating system (O/S) or provided by a predetermined application. In addition, a part of the software module may be provided by the operating system (O/S) and the other part thereof may be provided by the predetermined application.

In this case, the learning unit 1310 and the response unit 1320 may be mounted on one electronic device or may be mounted on separate electronic devices, respectively. For example, one of the learning unit 1310 and the response unit 1320 may be included in the electronic device 100 and the other one thereof may be included in an external server. In addition, the learning unit 1310 and the response unit 1320 may be connected in a wired or wireless manner so that the learning unit 1310 may provide constructed model information to the response unit 1320 and the data input to the response unit 1320 may be provided to the learning unit 1310 as additional learning data.

Figure 13:
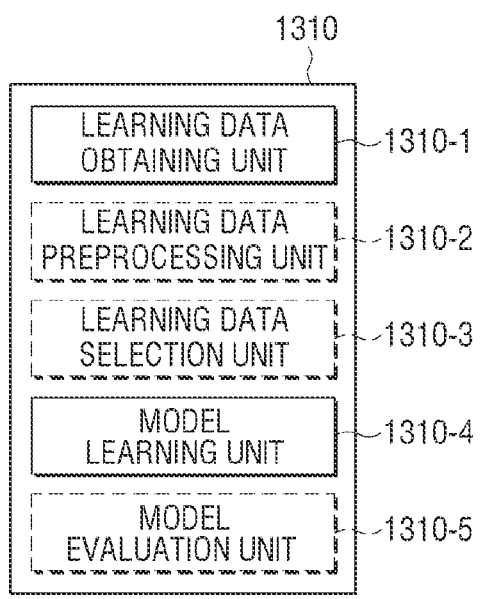
FIG. 13 is a block diagram illustrating a learning unit according to an embodiment.

FIG. 13 is a block diagram illustrating the learning unit 1310 according to an embodiment of the disclosure.

Referring to FIG. 13, the learning unit 1310 according to an embodiment may include a learning data obtaining unit 1310-1 and a model learning unit 1310-4. In addition, the learning unit 1310 may further selectively include at least one of a learning data preprocessing unit 1310-2, a learning data selection unit 1310-3, or a model evaluation unit 1310-5.

The learning data obtaining unit 1310-1 may obtain learning data necessary for the artificial intelligence model for obtaining the response to the user's voice. In an embodiment of the disclosure, the learning data obtaining unit 1310-1 may obtain the user's voice as the learning data. In addition, the learning data obtaining unit 1310-1 may obtain information necessary for obtaining a specific response to the user's voice (e.g., state information of the electronic device) as the learning data. The learning data may be data collected or tested by the learning unit 1310 or a manufacturer of the learning unit 1310.

The model learning unit 1310-4 may train the artificial intelligence model to have a criterion to obtain the response to the user's voice by using the learning data. For example, the model learning unit 1310-4 may train the artificial intelligence model through supervised learning using at least a part of the learning data as the criterion to obtain the response to the user's voice. In addition, the model learning unit 1310-4 may train the artificial intelligence model, for example, through unsupervised learning of finding out the criterion to provide the response by self-training using learning data without particular supervision. In addition, the model learning unit 1310-4 may train the artificial intelligence model, for example, through reinforcement learning using a feedback regarding whether or not a result of the response providing according to the training is accurate. Further, the model learning unit 1310-4 may train the artificial intelligence model, for example, by using a learning algorithm including error back-propagation or gradient descent.

The model learning unit 1310-4 may train a selectin criterion regarding which learning data is to be used to provide the information of the voice and the image including the response to the user's voice by using the input data.

If the number of artificial intelligence models constructed in advance is more than one, the model learning unit 1310-4 may determine an artificial intelligence model with basic learning data that is highly relevant to the input learning data as the artificial intelligence model to be trained. In such a case, the basic learning data pieces may be classified in advance for each type of data and the artificial intelligence model may be constructed in advance for each type of data. For example, the basic learning data pieces may be classified in advance based on various criteria such as a region where the learning data is generated, time when the learning data is generated, a size of the learning data, a genre of the learning data, a creator of the learning data, a type of an object in the learning data, and the like.

When the artificial intelligence model is trained, the model learning unit 1310-4 may store the trained artificial intelligence model. In such a case, the model learning unit 1310-4 may store the trained artificial intelligence model in a memory of the external server 1300. In addition, the model learning unit 1310-4 may store the trained artificial intelligence model in a memory of a server or an electronic device connected to the external server 1300 via a wired or wireless network.

The learning unit 1310 may further include the learning data preprocessing unit 1310-2 and the learning data selection unit 1310-3 in order to improve a response result of the artificial intelligence model or save resources or time necessary for providing the artificial intelligence model.

The learning data preprocessing unit 1310-2 may preprocess the obtained data so that the obtained data is used in the learning for obtaining the information including the response to the user's voice. The learning data preprocessing unit 1310-2 may process the obtained data in a predefined format so that the obtained data is used for obtaining the information including the response to the user's voice. For example, the learning data preprocessing unit 1310-2 may remove a text (e.g., adverb, exclamation, or the like) unnecessary when the artificial intelligence model provides the response, from the input user's voice.

The learning data selection unit 1310-3 may select data necessary for the learning from data obtained by the learning data obtaining unit 1310-1 or the data preprocessed by the learning data preprocessing unit 1310-2. The selected learning data may be provided to the model learning unit 1310-4. The learning data selection unit 1310-3 may select learning data necessary for learning from the obtained or preprocessed data according to a predetermined selection criterion. In addition, the learning data selection unit 1310-3 may select learning data according to the predetermined selection criterion according to the learning performed by the model learning unit 1310-4.

The learning unit 1310 may further include the model evaluation unit 1310-5 in order to improve a response result of the artificial intelligence model.

The model evaluation unit 1310-5 may input evaluation data to the artificial intelligence model and may cause the model learning unit 1310-4 to train again, if the response result output from the evaluation data does not satisfy the predetermined criterion. In such a case, the evaluation data may be predefined data for evaluating the artificial intelligence model.

For example, if a number or a rate of the evaluation data pieces having inaccurate response results, among response results of the trained artificial intelligence model regarding the evaluation data, exceeds a predetermined threshold value, the model evaluation unit 1310-5 may evaluate that the predetermined criterion is not satisfied.

If the number of trained artificial intelligence models is more than one, the model evaluation unit 1310-5 may evaluate whether or not each of the trained artificial intelligence models satisfies the predetermined criterion, and determine a model satisfying the predetermined criterion as a final artificial intelligence model. In this case, if the number of models satisfying the predetermined criterion is more than one, the model evaluation unit 1310-5 may determine any one or a predetermined number of models set in advance in the order of high evaluation grades as a final artificial intelligence model.

Figure 14:
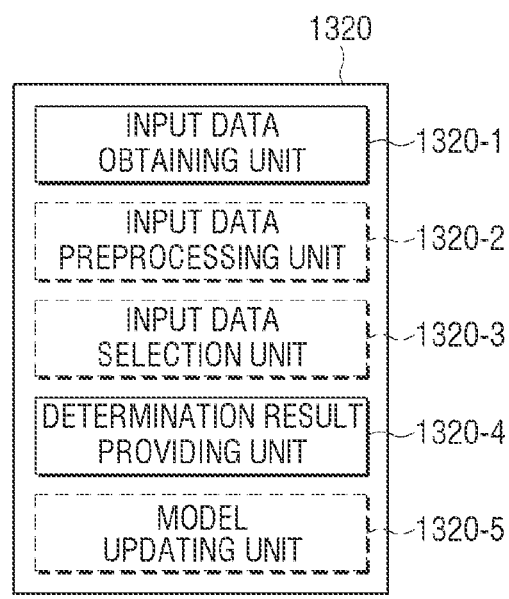
FIG. 14 is a block diagram illustrating a response unit according to an embodiment.

FIG. 14 is a block diagram illustrating the response unit 1320 according to an embodiment of the disclosure.

Referring to FIG. 14, the response unit 1320 according to an embodiment may include an input data obtaining unit 1320-1 and a response result providing unit 1320-4.

In addition, the response unit 1320 may further selectively include at least one of an input data preprocessing unit 1320-2, an input data selection unit 1320-3, or a model updating unit 1320-5.

The input data obtaining unit 1320-1 may obtain data necessary for obtaining the response to the user's voice. The response result providing unit 1320-4 may obtain information of a voice and an image including the response to the user's voice by applying the input data obtained by the input data obtaining unit 1320-1 to an artificial intelligence model trained with an input value.

The response result providing unit 1320-4 may obtain a response result by applying data selected by the input data preprocessing unit 1320-2 or the input data selection unit 1320-3 to the artificial intelligence model with the input value. The response result may be determined by the artificial intelligence model.

In an embodiment, the response result providing unit 1320-4 may obtain the information of the voice and the image including the response to the user's voice by applying the user's voice obtained by the input data obtaining unit 1320-1 and the electronic device to the trained artificial intelligence model.

The response unit 1320 may further include the input data preprocessing unit 1320-2 and the input data selection unit 1320-3 in order to improve the response result of the artificial intelligence model or save resources or time necessary for providing the response result.

The input data preprocessing unit 1320-2 may preprocess the obtained data so that the obtained data is used in order to obtain the response to the user's voice. The input data preprocessing unit 1320-2 may process the obtained data in a predefined format so that the response result providing unit 1320-4 may use the obtained data to obtain the response to the user's voice.

The input data selection unit 1320-3 may select data necessary for providing the response from data obtained by the input data obtaining unit 1320-1 or the data preprocessed by the input data preprocessing unit 1320-2. The selected data may be provided to the response result providing unit 1320-4. The input data selection unit 1320-3 may select some or all of the obtained or preprocessed data according to the predetermined selection criterion for providing the response. In addition, the input data selection unit 1320-3 may select data according to the predetermined selection criterion by the training of the model learning unit 1310-4.

The model updating unit 1320-5 may control to update the artificial intelligence model based on the evaluation regarding the response result provided by the response result providing unit 1320-4. For example, the model updating unit 1320-5 may request so that the model learning unit 1310-4 additionally trains or updates the artificial intelligence model by providing the response result provided by the response result providing unit 1320-4 to the model learning unit 1310-4.

Figure 15:
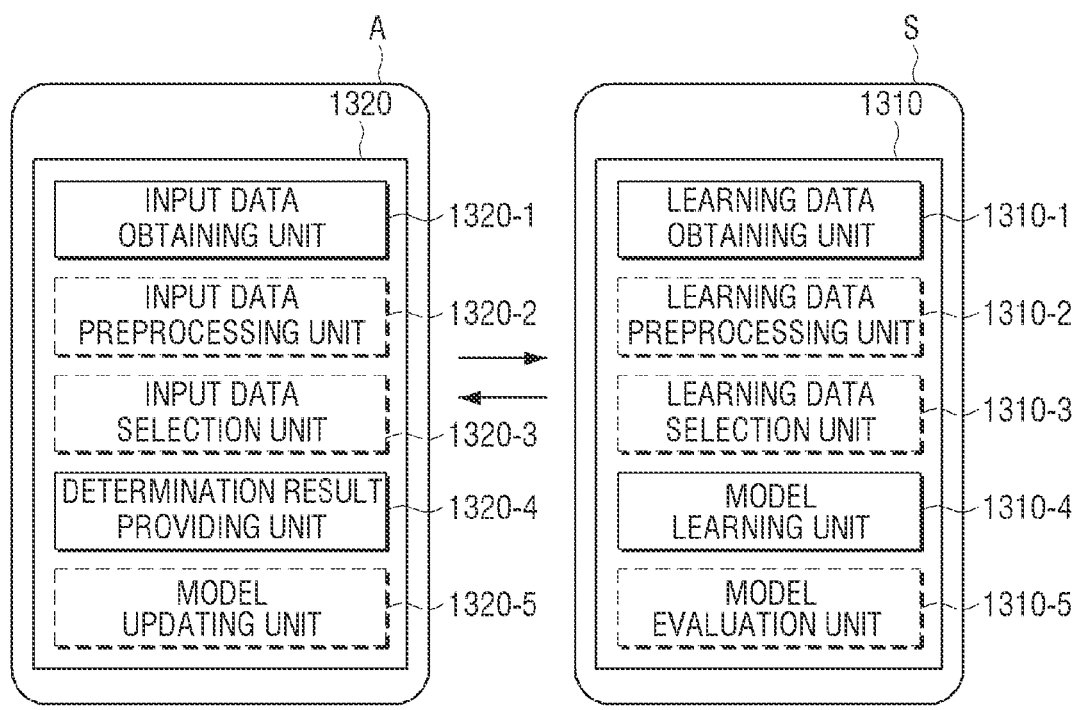
FIG. 15 is a view illustrating an example in which an electronic device and an external server are linked to each other to train and identify data according to an embodiment.

FIG. 15 is a view illustrating an example in which the electronic device 100 and an external server S are linked to each other to train and identify data according to an embodiment.

Referring to FIG. 15, the external server S may train the criterion for obtaining the information including the response to the user's voice, and the electronic device 100 may provide the response to the user's voice with the voice and the image based on the learning result by the server S.

In this case, the model learning unit 1310-4 of the server S may execute a function of the learning unit 1310 illustrated in FIG. 13. That is, the model learning unit 1310-4 of the server S may train a criterion regarding which text information or state information of the electronic device is to be used for obtaining the response to the user's voice or how to obtain the response to the user's voice by using the above information.

In addition, the response result providing unit 1320-4 of the electronic device 100 may obtain the response to the user's voice by applying the data selected by the input data selection unit 1320-3 to the artificial intelligence model generated by the server S. Further, the response result providing unit 1320-4 of the electronic device 100 may receive the artificial intelligence model generated by the server S to the server S and obtain the response to the user's voice by using the received artificial intelligence model.

Figure 16:
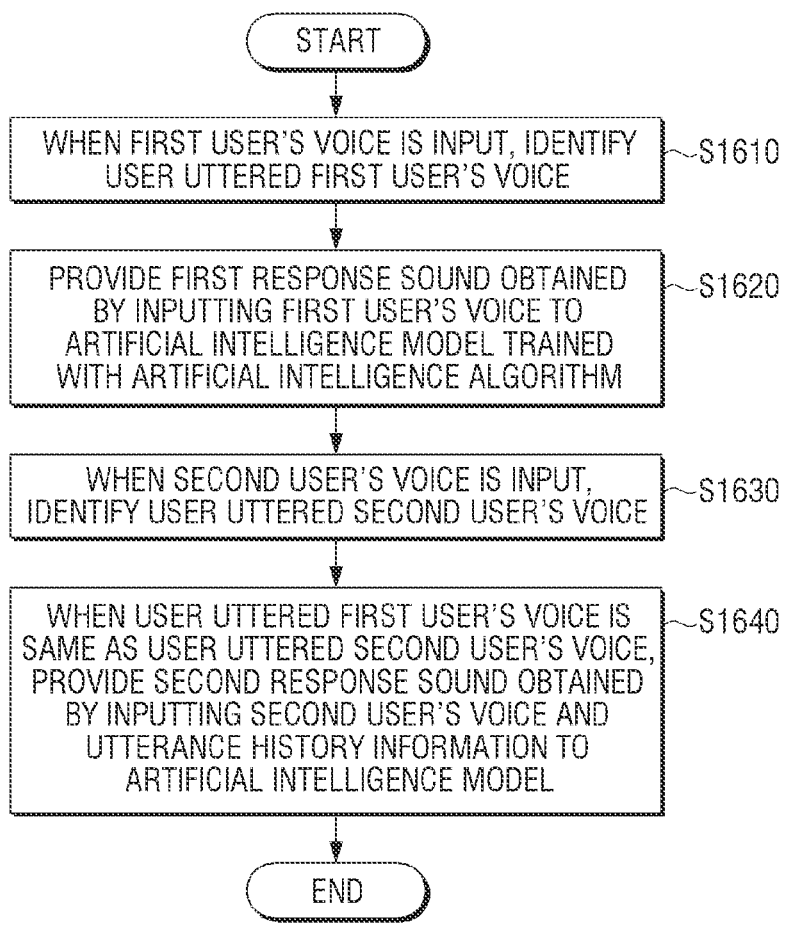
FIG. 16 is a flowchart for explaining a method for controlling an electronic device according to an embodiment.

FIG. 16 is a flowchart for explaining a method for controlling an electronic device according to an embodiment of the disclosure.

When a first user's voice is input, a user who uttered the first user's voice is identified (S1610). A first response sound obtained by inputting the first user's voice to an artificial intelligence model trained with an artificial intelligence algorithm is provided (S1620). When a second user's voice is input, a user who uttered the second user's voice is identified (S1630). When the user who uttered the first user's voice is the same as the user who uttered the second user's voice, a second response sound obtained by inputting the second user's voice and utterance history information to the artificial intelligence model is provided (S1640).

The control method may further include, based on the user who uttered the first user's voice being different from the user who uttered the second user's voice, storing a second user's voice, and based on a user's voice not being input from the user who uttered the first user's voice for a predetermined period of time or longer, providing a third response sound obtained by inputting the second user's voice to the artificial intelligence model.

Step S1610 of identifying a user who uttered the first user's voice may include, based on the first user's voice being input, identifying a first user who uttered the first user's voice, Step S1620 of providing a first response sound may include providing the first response sound obtained by inputting the first user's voice to the artificial intelligence model, step S1630 of identifying a user who uttered the second user's voice may include identifying a second user who uttered the second user's voice, and the control method may further include providing a third response sound obtained by inputting the second user's voice to the artificial intelligence model to be distinct from the first response sound.

The control method may further include, based on a first additional user's voice being input by the first user's voice, providing a first additional response sound obtained by inputting the first additional user's voice and first utterance history information corresponding to the first user's voice to the artificial intelligence model, and based on a second additional user's voice being input by a second user, providing a second additional response sound obtained by inputting the second additional user's voice and second utterance history information corresponding to the second user's voice to the artificial intelligence model to be distinct from the first additional response sound.

The providing a first additional response sound may include displaying a first UI corresponding to the first user while providing the first additional response sound, and the providing a second additional response sound to be distinct from the first additional response sound may include displaying a second UI corresponding to the second user while providing the second additional response sound.

The control method may further include, based on the user who uttered the first user's voice not being the same as the user who uttered the second user's voice, obtaining a first domain corresponding to the first user's voice and a second domain corresponding to the second user's voice, and based on the first domain being same as the second domain, providing a second response sound obtained by inputting the second user's voice and the utterance history information to the artificial intelligence model.

In the control method, when the second user's voice is input within a first predetermined period of time from a point when the first user's voice is input, the user who uttered the first user's voice is the same as the user who uttered the second user's voice, and the first domain corresponding to the first user's voice is different from the second domain corresponding to the second user's voice, the first user's voice may be stored without providing the first response sound, and a third response sound obtained by inputting the second user's voice to the artificial intelligence model may be provided.

The control method may further include providing a first response sound obtained by inputting the first user's voice to the artificial intelligence model, when the user's voice corresponding to the second domain is not input for a second predetermined period of time from the user.

Steps S1610 and S1630 of identifying a user may include identifying a user based on at least one of a captured image or an input user's voice.

Step S1610 of identifying a user who uttered the first user's voice may include identifying a user who uttered the first user's voice based on a shape of mouth of the user included in an image for a period of time during which the first user's voice is input, and Step S1640 of providing a second response sound may include, based on the shape of mouth of the identified user included in the image being changed for a period of time during which the second user's voice is input, identifying that the user who uttered the first user's voice is the same as the user who uttered the second user's voice.

According to the embodiments of the disclosure described above, when the user's voices are input from the plurality of users, respectively, the electronic device may provide responses while maintaining the context according to processing, postponing, or separately processing the plurality of user's voices based on the existing user's voice.

Hereinabove, it is described that one piece of utterance history information is generated with respect to one user, but there is no limitation thereto. For example, when the first user's voice of the user A is input in a state where the first utterance history information of the user A and the second utterance history information of the user B are stored, the processor may provide a first response sound obtained by inputting the first user's voice and the first utterance history information to the artificial intelligence model and a second response sound obtained by inputting the first user's voice and the second utterance history information to the artificial intelligence model. Through the operation described above, the processor may provide a sense of conversation with a plurality of utterers to the user.

The processor may obtain information such as a title, progress completion information, information in progress, time information, user information, final interaction information, keywords, content summary, and the like with respect to the utterance history information of the completed interaction and store these in the storage. Then, if the user utters a user's voice for searching for the past utterance history information, the processor may obtain the utterance history information corresponding to the user's voice based on the information stored in the storage. When an additional user's voice is input, the processor may provide a response sound to the additional user's voice based on the obtained utterance history information. That is, the user may execute the interaction to continue from the past utterance.

According to an embodiment of the disclosure, various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device A) according to the disclosed embodiments. In a case where the instruction is executed by a processor, the processor may execute a function corresponding to the instruction directly or using other elements under the control of the processor. The instruction may include a code generated by a compiler or executed by an interpreter. The machine-readable storage medium may be provided in a form of a non-transitory storage medium. Herein, the term "non-transitory" merely mean that the storage medium is tangible while not including signals, and it does not distinguish that data is semi-permanently or temporarily stored in the storage medium.

According to an embodiment of the disclosure, the methods according to various embodiments described above may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

According to an embodiment of the disclosure, the embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may execute one or more functions and operations described in this specification.

Computer instructions for executing processing operations according to the embodiments descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

In addition, each of the elements (e.g., a module or a program) according to various embodiments described above may be composed of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. An electronic device comprising:
  a microphone comprising circuitry;
  a communication interface;
  a speaker comprising circuitry; and
  a processor electrically connected to the microphone, the communication interface and the speaker,
  wherein the processor is configured to:
    based on a first user's voice being input via the microphone, identify a user who uttered the first user's voice,
    control the communication interface to transmit the first user's voice to a server, and receive a first response sound from the server through the communication interface,
    provide the first response sound via the speaker,
    based on a second user's voice being input via the microphone, identify a user who uttered the second user's voice,
    based on the user who uttered the first user's voice being the same as the user who uttered the second user's voice, control the communication interface to transmit the second user's voice and utterance history information to the server, and receive a second response sound from the server through the communication interface, and provide the second response sound via the speaker,
wherein the server is configured to obtain the first response sound by inputting the first user's voice to an artificial intelligence model trained through an artificial intelligence algorithm, and the second response sound by inputting the second user's voice and the utterance history information to the artificial intelligence model, and
wherein the utterance history information comprises user's voice including the first user's voice and a response sound including the first response sound.

2. The electronic device according to claim 1, further comprising:
a storage comprising circuitry,
wherein the processor is further configured to:
based on the user who uttered the second user's voice being different from the user who uttered the first user's voice, store the second user's voice in the storage,
based on a user's voice not being input from the user who uttered the first user's voice for a predetermined period of time or longer, control the communication interface to transmit the second user's voice to the server, and receive a third response sound from the server through the communication interface, and
provide the third response sound via the speaker, and
wherein the server is configured to obtain the third response sound by inputting the second user's voice to the artificial intelligence model.

3. The electronic device according to claim 1,
wherein the processor is further configured to:
based on the user who uttered the first user's voice being different from the user who uttered the second user's voice, control the communication interface to transmit the second user's voice to the server, and receive a third response sound from the server through the communication interface, and
provide the third response sound via the speaker, and
wherein the server is configured to obtain the third response sound by inputting the second user's voice to the artificial intelligence model.

4. The electronic device according to claim 3,
wherein the processor is further configured to:
based on a first additional user's voice being input by the first user, control the communication interface to transmit the first user's voice and first utterance history information corresponding to the first user's voice to the server, and receive a first additional response sound from the server through the communication interface,
provide the first additional response sound via the speaker,
based on a second additional user's voice being input by the second user, control the communication interface to transmit the second user's voice and second utterance history information corresponding to the second user's voice to the server, and receive a second additional response sound from the server through the communication interface, and
provide the second additional response sound via the speaker to be distinct from the first additional response sound, and
wherein the server is configured to obtain the first additional response sound by inputting the first user's voice and the first utterance history information to the artificial intelligence model, and the second response sound by inputting the second user's voice and the second utterance history information to the artificial intelligence model.

5. The electronic device according to claim 4, further comprising:
a display electrically connected to the processor,
wherein the processor is further configured to:
control the display to display a first UI corresponding to the first user while providing the first additional response sound, and
control the display to display a second UI corresponding to the second user via the display while providing the second additional response sound.

6. The electronic device according to claim 1, wherein the processor is further configured to:
based on the user who uttered the first user's voice being different from the user who uttered the second user's voice, obtain a first domain corresponding to the first user's voice and a second domain corresponding to the second user's voice, and
based on the first domain being the same as the second domain, control the communication interface to transmit the second user's voice and the utterance history information to the server.

7. The electronic device according to claim 1, further comprising:
a storage electrically connected to the processor,
wherein the processor is further configured to:
based on the second user's voice being input within a first predetermined period of time from a point when the first user's voice is input, the user who uttered the first user's voice being the same as the user who uttered the second user's voice, and a first domain corresponding to the first user's voice being different from a second domain corresponding to the second user's voice, store the first user's voice in the storage without providing the first response sound,
control the communication interface to transmit the second user's voice to the server, and receive a third response sound from the server through the communication interface, and
provide the third response sound via the speaker, and
wherein the server is configured to obtain the third response sound by inputting the second user's voice to the artificial intelligence model.

8. The electronic device according to claim 7, wherein the processor is further configured to, based on a user's voice corresponding to the second domain not being input from the user for a second predetermined period of time or longer, provide the first response sound via the speaker.

9. The electronic device according to claim 1, further comprising:
a camera comprising circuitry,
wherein the processor is further configured to identify the user based on at least one of an image captured by the camera or a user's voice input via the microphone.

10. The electronic device according to claim 9, wherein the processor is further configured to:
identify the user who uttered the first user's voice based on a shape of mouth of a user included in the image for a period of time during which the first user's voice is input, and
based on the shape of mouth of the identified user included in the image being changed for a period of time during which the second user's voice is input, identify the user who uttered the second user's voice to be the same as the user who uttered the first user's voice.

11. A method for controlling an electronic device, the method comprising:
based on a first user's voice being input, identifying a user who uttered the first user's voice;
transmitting the first user's voice to a server, and receiving a first response sound from the server;
providing the first response sound;
based on a second user's voice being input, identifying a user who uttered the second user's voice;
based on the user who uttered the first user's voice being the same as the user who uttered the second user's voice, transmitting the second user's voice and utterance history information to the server, and receiving a second response sound from the server; and
providing the second response sound,
wherein the server is configured to obtain the first response sound by inputting the first user's voice to an artificial intelligence model trained through an artificial intelligence algorithm, and the second response sound by inputting the second user's voice and the utterance history information to the artificial intelligence model, and
wherein the utterance history information comprises user's voice including the first user's voice and a response sound including the first response sound.

12. The method according to claim 11, further comprising:
based on the user who uttered the second user's voice being different from the user who uttered the first user's voice, storing the second user's voice;
based on a user's voice not being input from the user who uttered the first user's voice for a predetermined period of time or longer, transmitting the second user's voice to the server, and receiving a third response sound from the server; and
providing the third response sound,
wherein the server is configured to obtain the third response sound by inputting the second user's voice to the artificial intelligence model.

13. The method according to claim 11, further comprising:
based on the user who uttered the first user's voice being different from the user who uttered the second user's voice, transmitting the second user's voice to the server, and receive a third response sound from the server through a communication interface; and
providing the third response sound,
wherein the server is configured to obtain the third response sound by inputting the second user's voice to the artificial intelligence model.

14. The method according to claim 13, further comprising:
based on a first additional user's voice being input by the first user, transmitting the first user's voice and first utterance history information corresponding to the first user's voice to the server, and receiving a first additional response sound from the server;
providing the first additional response sound;
based on a second additional user's voice being input by the second user, transmitting the second user's voice and second utterance history information corresponding to the second user's voice to the server, and receiving a second additional response sound from the server; and providing the second additional response sound to be distinct from the first additional response sound,
wherein the server is configured to obtain the first additional response sound by inputting the first user's voice and the first utterance history information to the artificial intelligence model, and the second response sound by inputting the second user's voice and the second utterance history information to the artificial intelligence model.

15. The method according to claim 14,
wherein the providing a first additional response sound comprises a first UI corresponding to the first user while providing the first additional response sound, and
wherein the providing a second additional response sound to be distinct from the first additional response sound comprises displaying a second UI corresponding to the second user while providing the second additional response sound.

16. The method according to claim 11, further comprising:
based on the user who uttered the first user's voice being different from the user who uttered the second user's voice, obtaining a first domain corresponding to the first user's voice and a second domain corresponding to the second user's voice; and
based on the first domain being the same as the second domain, transmitting the second user's voice and the utterance history information to the server.

17. The method according to claim 11, further comprising:
based on the second user's voice being input within a first predetermined period of time from a point when the first user's voice is input, the user who uttered the first user's voice being the same as the user who uttered the second user's voice, and a first domain corresponding to the first user's voice being different from a second domain corresponding to the second user's voice, storing the first user's voice in a storage included in the electronic device without providing the first response sound;
transmitting the second user's voice to the server, and receiving a third response sound from the server; and
providing the third response sound,
wherein the server is configured to obtain the third response sound by inputting the second user's voice to the artificial intelligence model.

18. The method according to claim 17, further comprising:
based on a user's voice corresponding to the second domain not being input from the user for a second predetermined period of time or longer, providing the first response sound.

19. The method according to claim 11, wherein the identifying comprises identifying the user based on at least one of an image captured by a camera included in the electronic device or a user's voice input via a microphone included in the electronic device.

20. The method according to claim 19,
wherein the identifying the user who uttered the first user's voice comprises identifying the user who uttered the first user's voice based on a shape of mouth of a user included in the image for a period of time during which the first user's voice is input, and
wherein transmitting the second user's voice and utterance history information comprises, based on the shape of mouth of the identified user included in the image being changed for a period of time during which the second user's voice is input, identifying the user who uttered the second user's voice to be the same as the user who uttered the first user's voice.

\* \* \* \* \*